US012613499B2

(12) United States Patent
Ko et al.

(10) Patent No.: US 12,613,499 B2
(45) Date of Patent: Apr. 28, 2026

(54) INFORMATION PROCESSING WITH AN OBJECTIVE FUNCTION THAT INCLUDES A GENERATED REGULARIZATION TERM USING AN APPARATUS, INFORMATION PROCESSING METHOD, AND NON-TRANSITORY COMPUTER READABLE MEDIUM

(71) Applicant: KABUSHIKI KAISHA TOSHIBA, Minato-ku (JP)

(72) Inventors: Myungsook Ko, Ota (JP); Tatsuya Inagi, Kawasaki (JP); Masaaki Takada, Abiko (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 607 days.

(21) Appl. No.: 16/817,465

(22) Filed: Mar. 12, 2020

(65) Prior Publication Data

US 2020/0393799 A1 Dec. 17, 2020

(30) Foreign Application Priority Data

Jun. 14, 2019 (JP) ................................. 2019-111386

(51) Int. Cl.
| | |
|---|---|
| *G05B 13/02* | (2006.01) |
| *G05B 13/04* | (2006.01) |
(Continued)

(52) U.S. Cl.
CPC ....... *G05B 13/0265* (2013.01); *G05B 13/041* (2013.01); *G05B 13/042* (2013.01);
(Continued)

(58) Field of Classification Search
CPC .. G06N 20/00; G05B 13/0265; G05B 13/041; G05B 13/042; G06F 17/18; G06F 18/241; G06K 9/6268
See application file for complete search history.

(56) References Cited

U.S. PATENT DOCUMENTS

| | | | |
|---|---|---|---|
| 8,566,070 B2 | 10/2013 | Tamaki et al. | |
| 9,185,007 B2 * | 11/2015 | Fletcher ................ | H04L 43/106 |
(Continued)

FOREIGN PATENT DOCUMENTS

| | | | | |
|---|---|---|---|---|
| CN | 105975443 A | * | 9/2016 | ............. G06F 17/18 |
| JP | 2001306603 A | * | 11/2001 | |
(Continued)

OTHER PUBLICATIONS

Kong, Deguang, and Chris Ding. "Efficient algorithms for selecting features with arbitrary group constraints via group lasso." (IEEE, 2013). In 2013 IEEE 13th International Conference on Data Mining, pp. 379-388. DOI 10.1109/ICDM.2013.168 (Year: 2013).*
(Continued)

*Primary Examiner* — Andre Pierre Louis
*Assistant Examiner* — Daniel E Miller
(74) *Attorney, Agent, or Firm* — Oblon, McClelland, Maier & Neustadt, L.L.P.

(57) ABSTRACT

An information processing apparatus according to an embodiment of the present invention includes a group setting device configured to group a plurality of variables included in operation data into at least one type of groups, based on structure data representing a structural relation among the plurality of variables; a regularization term generator configured to generate at least one regularization term corresponding to the at least one type based on a coefficient for the variable included in the at least one type of groups, and a coefficient estimator configured to estimate, (Continued)

based on the operation data and an objective function including the at least one regularization term, values of a plurality of the coefficients for the plurality of variables.

14 Claims, 19 Drawing Sheets

(51) Int. Cl.
| | | |
|---|---|---|
| *G06F 17/18* | (2006.01) | |
| *G06F 18/241* | (2023.01) | |
| *G06N 20/00* | (2019.01) | |

(52) U.S. Cl.
CPC ............ *G06F 17/18* (2013.01); *G06F 18/241* (2023.01); *G06N 20/00* (2019.01)

(56) References Cited

U.S. PATENT DOCUMENTS

| | | | | |
|---|---|---|---|---|
| 9,426,045 | B2 * | 8/2016 | Fletcher | .............. G06F 9/45533 |
| 9,558,453 | B1 * | 1/2017 | Chaudhary | ............. G06F 17/18 |
| 11,216,741 | B2 | 1/2022 | Takada et al. | |
| 2013/0204810 | A1 * | 8/2013 | Morinaga | .............. G06N 20/00 |
| | | | | 706/12 |
| 2014/0236869 | A1 * | 8/2014 | Fujimaki | ................. G06F 17/16 |
| | | | | 706/11 |
| 2014/0236871 | A1 * | 8/2014 | Fujimaki | ................ G06N 20/00 |
| | | | | 706/12 |
| 2014/0309122 | A1 * | 10/2014 | Min | ........................ G16B 50/10 |
| | | | | 702/19 |
| 2018/0219889 | A1 * | 8/2018 | Oliner | ...................... G06N 3/08 |
| 2018/0262525 | A1 | 9/2018 | Yan et al. | |
| 2019/0130659 | A1 * | 5/2019 | Ide | .......................... G07C 5/006 |
| 2020/0250515 | A1 * | 8/2020 | Rifkin | ................. G06N 3/0472 |
| 2020/0285939 | A1 * | 9/2020 | Baker | ...................... G06F 18/24 |

FOREIGN PATENT DOCUMENTS

| | | | |
|---|---|---|---|
| JP | 2010-267201 | A | 11/2010 |
| JP | 2010-287011 | A | 12/2010 |
| JP | 2013-250192 | A | 12/2013 |
| JP | 2016-197375 | A | 11/2016 |
| JP | 2018-151883 | A | 9/2018 |
| JP | 2018-185794 | A | 11/2018 |
| WO | WO-2020247949 | A1 * | 12/2020 |

OTHER PUBLICATIONS

Ringsquandl, Martin, Steffen Lamparter, Sebastian Brandt, Thomas Hubauer, and Raffaello Lepratti. "Semantic-guided feature selection for industrial automation systems." (Springer, Cham, 2015). International Semantic Web Conference 2015, Part II, LNCS 9367 pp. 225-240. DOI: 10.1007/978-3-319-25010-6 13 (Year: 2015).*

Lin, Meixia, Yong-Jin Liu, Defeng Sun, and Kim-Chuan Toh. "Efficient sparse semismooth Newton methods for the clustered Lasso problem." (SIAM, 2019) SIAM Journal on Optimization 29, No. 3: 2026-2052. https://doi.org/10.1137/18M1207752 (Year: 2019).*

Zhao, P. (2006). Regularization: Sparsity, structure and computation (Order No. 3228537). Available from ProQuest Dissertations & Theses Global. (305362161). Retrieved from https://www.proquest.com/dissertations-theses/regularization-sparsity-structure-computation/docview/305362161/se-2 (Year: 2006).*

Pampuri, Simone, Andrea Schirru, Giuseppe Fazio, and Giuseppe De Nicolao. "Multilevel lasso applied to virtual metrology in semiconductor manufacturing." In 2011 IEEE international conference on automation science and engineering, pp. 244-249. IEEE, 2011. (Year: 2011).*

Fujiwara, Koichi, and Manabu Kano. "Efficient input variable selection for soft-senor design based on nearest correlation spectral clustering and group Lasso." ISA transactions 58 (2015): 367-379. (Year: 2015).*

Lee, S. "Signature Selection for Grouped Features with a Case Study on Exon Microarrays" In: Stańczyk, U., Jain, L. (eds) Feature Selection for Data and Pattern Recognition. Studies in Computational Intelligence, vol. 584. (Springer, 2015) Berlin. https://doi.org/10.1007/978-3-662-45620-0_14 (Year: 2015).*

Arenas, Marcelo, Claudio Gutierrez, and Jorge Pérez. "Foundations of RDF databases." In Reasoning Web International Summer School, pp. 158-204. Berlin, Heidelberg: Springer Berlin Heidelberg, 2009. (Year: 2009).*

Destino, Giuseppe, and Davide Macagnano. "Semantic positioning via structured sparsity models." In 2014 IEEE World Forum on Internet of Things (WF-IoT), pp. 106-110. IEEE, 2014. (Year: 2014).*

Yan, Xiaohan, and Jacob Bien. "Hierarchical Sparse Modeling: A Choice of Two Group Lasso Formulations." Statistical Science 32, No. 4 (2017): 531-560. (Year: 2017).*

Wang, Shuangyuan, Yixiang Huang, Liang Gong, Lin Li, and Chengliang Liu. "Improved feature extraction using structured Fisher discrimination sparse coding scheme for machinery fault diagnosis." Advances in Mechanical Engineering 8, No. 12 (2016): 1687814016683085. (Year: 2016).*

Liu, Haining, Chengliang Liu, and Yixiang Huang. "Adaptive feature extraction using sparse coding for machinery fault diagnosis." Mechanical Systems and Signal Processing 25, No. 2 (2011): 558-574. (Year: 2011).*

Takada, Masaaki, Sho Saiki, Sachio Sueyoshi, Hidetaka Eguchi, and Takeichiro Nishikawa. "Intelligent causal analysis system for wafer quality control using sparse modeling." In Proc. AEC/APC symposium Asia 2017, pp. 1-4. 2017. (Year: 2017).*

Takada, Masaaki, Taiji Suzuki, and Hironori Fujisawa. "Independently interpretable lasso: A new regularizer for sparse regression with uncorrelated variables." In International Conference on Artificial Intelligence and Statistics, pp. 454-463. PMLR, 2018. (Year: 2018).*

* cited by examiner

| DATE | APPARATUS id | DATA id | FAILURE | MOTOR OPERATION | COMPANY A MOTOR OPERATION | COMPANY B MOTOR OPERATION | COMPANY C MOTOR OPERATION | REFLECTOR OPERATION | PICKUP UNIT OPERATION | BELT SPEED ZONE: HIGH | BELT SPEED ZONE: MEDIUM | BELT SPEED ZONE: LOW | ... |
|---|---|---|---|---|---|---|---|---|---|---|---|---|---|
| ... | A | 1 | PRESENT | 1 | 1 | 0 | 0 | 1 | 1 | 1 | 0 | 0 | ... |
| ... | B | 2 | ABSENT | 0 | 0 | 0 | 0 | 0 | 0 | 0 | 0 | 0 | ... |
| ... | C | 3 | ABSENT | 1 | 1 | 0 | 0 | 0 | 1 | 1 | 0 | 0 | ... |
| ... | D | 4 | PRESENT | 1 | 1 | 0 | 0 | 1 | 0 | 0 | 0 | 1 | ... |
| ... | ... | ... | ... | ... | ... | | | ... | ... | ... | ... | ... | ... |

FIG. 2

| FIRST DATA NAME (VARIABLE) | RELATION | SECOND DATA NAME (VARIABLE) |
|---|---|---|
| COMPANY A MOTOR OPERATION | is-a | MOTOR OPERATION |
| COMPANY B MOTOR OPERATION | is-a | MOTOR OPERATION |
| COMPANY C MOTOR OPERATION | is-a | MOTOR OPERATION |
| BELT OPERATION | part-of | LANE CONVEYANCE UNIT OPERATION |
| ROLLER OPERATION | part-of | LANE CONVEYANCE UNIT OPERATION |
| MOTOR OPERATION | part-of | LANE CONVEYANCE UNIT OPERATION |
| PICKUP UNIT OPERATION | part-of | CONVEYANCE UNIT OPERATION |
| LANE CONVEYANCE UNIT OPERATION | part-of | CONVEYANCE UNIT OPERATION |
| COMPANY A MOTOR | has<attribute>-of | BELT SPEED ZONE: HIGH |
| COMPANY B MOTOR | has<attribute>-of | BELT SPEED ZONE: MEDIUM |
| SPEED VALUE OF MOTOR | has-effect-of | SPEED VALUE OF BELT |
| . . . | . . . | . . . |

FIG. 3

| GROUP ID | DATA NAME (VARIABLE) |
|---|---|
| G1 | COMPANY A MOTOR |
| G1 | COMPANY B MOTOR |
| G1 | COMPANY C MOTOR |
| G2 | BELT OPERATION |
| G2 | ROLLER OPERATION |
| G2 | MOTOR OPERATION |
| G3 | BELT OPERATION |
| G3 | ROLLER OPERATION |
| G3 | MOTOR OPERATION |
| G3 | CONVEYANCE ROLLER OPERATION |
| G3 | PRESSER OPERATION |
| . . . | . . . |
| G11 | COMPANY A UNIT |
| G11 | COMPANY B UNIT |
| G11 | COMPANY C UNIT |
| G12-1 | COMPANY A MOTOR |
| G12-2 | SPEED ZONE: HIGH |
| . . . | . . . |

FIG. 5

\<EVALUATION FUNCTION EXAMPLE\>

(A) $\quad (y - X\beta)^2$ (B) $\quad \left(y - \sum_m X^m \beta^m\right)^2 \qquad m: \text{GROUP}$ (C) $\quad -\left[\sum_i y^i \log\left(\phi(z^i)\right) + (1 - y^i)\log\left(1 - \phi(z^i)\right)\right]$ $\phi(z) = \dfrac{1}{1 + e^{-z}} \qquad z = \beta^T X$ (D) $\quad -\left[\sum_i y^i \log\left(\phi(z^i)\right) + (1 - y^i)\log\left(1 - \phi(z^i)\right)\right]$ $\phi(z) = \dfrac{1}{1 + e^{-z}} \qquad z = \sum_m (\beta^m)^T X^m$

FIG. 6

\<REGULARIZATION TERM EXAMPLE\>

(A) Group Lasso $\qquad \sum_{g \in G} \lambda_g \, \|\, \beta^g \,\|_2 \qquad$ $\lambda$: REGULARIZATION PARAMETER
$g$: GROUP (B) Overlapping Group Lasso $\qquad \sum_{t \in T} \lambda_t \, \|\, \beta^t \,\|_2 \qquad$ $\lambda$: 正則化パラメータ
$t$: GROUP (C) Clustered Lasso $\qquad \sum_{(j,k) \in p} \lambda_p w_{j,k} \, \|\, \beta_j - \beta_k \,\|_2 \qquad$ $\lambda$: REGULARIZATION PARAMETER
$p$: LINK SET

FIG. 7

<REGULARIZATION TERM EXAMPLE>

(A)   L2 (Ridge)          $\lambda_r \sum_s \| \beta_s \|_2$ (B)   L1 (Lasso)          $\lambda_l \sum_h \| \beta_h \|_1$

FIG. 8

| RELATION | REGULARIZATION TYPE | REGULARIZATION PARAMETER $\lambda$ |
|---|---|---|
| is-a | Group Lasso | 0.2 |
| part-of | Overlapping Croup Lasso | 0.1 |
| has<attribute>-of | Clustered Lasso | 0.3 |
| has SPEED ZONE-of | L2 | 0.4 |
| has-effect-of | Clustered Lasso | 0.3 |
| object | L1 | 0.2 |
| . . . | . . . | . . . |

FIG. 9

| DATA NAME (VARIABLE) | COEFFICIENT Bi |
|---|---|
| COMPANY A MOTOR | 10 |
| COMPANY B MOTOR | 0.1 |
| COMPANY C MOTOR | 0.1 |
| BELT OPERATION | 0.3 |
| ROLLER OPERATION | 0.2 |
| MOTOR OPERATION | 5 |
| COMPANY A UNIT | 10 |
| COMPANY B UNIT | 0.1 |
| COMPANY C UNIT | 7 |
| EXTRACTION ROLLER OPERATION | . . . |
| PRESSER OPERATION | . . . |
| COMPANY A MOTOR | . . . |
| REFLECTOR OPERATION | . . . |
| LIGHT EMITTER OPERATION | . . . |
| SPEED ZONE: HIGH | . . . |
| . . . | . . . |

FIG. 10

| RELATION ID | DATA NAME (VARIABLE) | COEFFICIENT B i | STRUCTURAL RELATION | ADJACENT DATA NAME (ADJACENT VARIABLE) |
|---|---|---|---|---|
| G1 | COMPANY A MOTOR | 10 | is-a | MOTOR OPERATION |
| G1 | COMPANY B MOTOR | 0.1 | is-a | MOTOR OPERATION |
| G1 | COMPANY C MOTOR | 0.1 | is-a | MOTOR OPERATION |
| G2 | BELT OPERATION | 0.3 | part-of | LANE CONVEYANCE UNIT OPERATION |
| G2 | ROLLER OPERATION | 0.2 | part-of | LANE CONVEYANCE UNIT OPERATION |
| G2 | MOTOR OPERATION | 5 | part-of | LANE CONVEYANCE UNIT OPERATION |
| . . . | . . . | . . . | . . . | . . . |
| G11 | COMPANY A UNIT | 10 | is-a | CONVEYANCE UNIT OPERATION |
| G11 | COMPANY B UNIT | 0.1 | is-a | CONVEYANCE UNIT OPERATION |
| G11 | COMPANY C UNIT | 7 | is-a | CONVEYANCE UNIT OPERATION |
| . . . | . . . | . . . | . . . | . . . |

FIG. 11

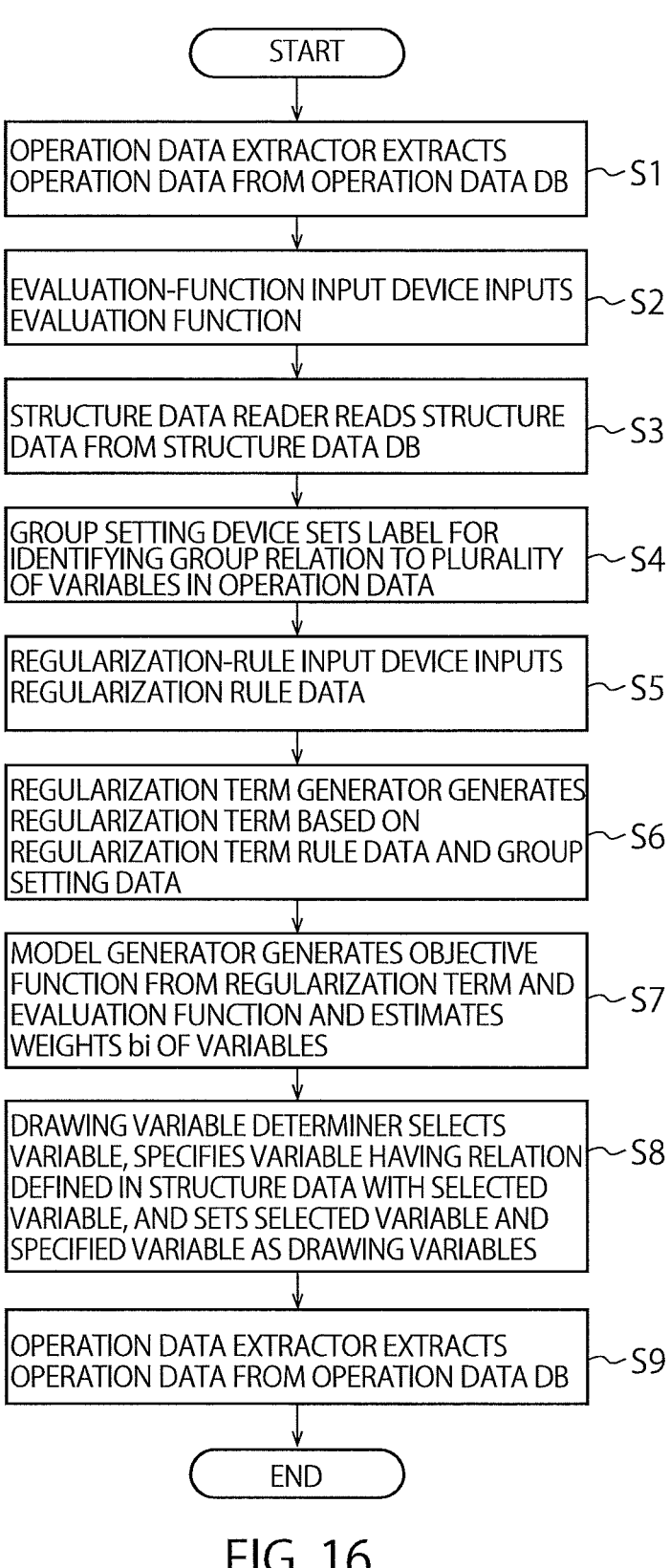

START

OPERATION DATA EXTRACTOR EXTRACTS
OPERATION DATA FROM OPERATION DATA DB          ～S1

EVALUATION-FUNCTION INPUT DEVICE INPUTS
EVALUATION FUNCTION          ～S2

STRUCTURE DATA READER READS STRUCTURE
DATA FROM STRUCTURE DATA DB          ～S3

GROUP SETTING DEVICE SETS LABEL FOR
IDENTIFYING GROUP RELATION TO PLURALITY          ～S4
OF VARIABLES IN OPERATION DATA

REGULARIZATION-RULE INPUT DEVICE INPUTS
REGULARIZATION RULE DATA          ～S5

REGULARIZATION TERM GENERATOR GENERATES
REGULARIZATION TERM BASED ON
REGULARIZATION TERM RULE DATA AND GROUP          ～S6
SETTING DATA

MODEL GENERATOR GENERATES OBJECTIVE
FUNCTION FROM REGULARIZATION TERM AND
EVALUATION FUNCTION AND ESTIMATES          ～S7
WEIGHTS bi OF VARIABLES

DRAWING VARIABLE DETERMINER SELECTS
VARIABLE, SPECIFIES VARIABLE HAVING RELATION          ～S8
DEFINED IN STRUCTURE DATA WITH SELECTED
VARIABLE, AND SETS SELECTED VARIABLE AND
SPECIFIED VARIABLE AS DRAWING VARIABLES

OPERATION DATA EXTRACTOR EXTRACTS
OPERATION DATA FROM OPERATION DATA DB          ～S9

END

FIG. 16

INFORMATION PROCESSING WITH AN OBJECTIVE FUNCTION THAT INCLUDES A GENERATED REGULARIZATION TERM USING AN APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2019-111386, filed on Jun. 14, 2019, the entire contents of which are incorporated herein by reference.

FIELD

Embodiments described herein relate to an information processing apparatus, an information processing method, and a non-transitory computer readable medium.

BACKGROUND

It is a common practice to use data collected from an apparatus and execute machine learning to learn a model for, for example, detecting an abnormality of the apparatus. The data collected from the apparatus includes a plurality of variables. When there is structural relationship among the variables, variables used in the model can be narrowed down by generating an objective function, which includes a regularization term reflecting a relation among the variables, and optimizing the objective function. Consequently, for example, an effect of improving interpretability of the model can be expected. For example, a factor of the abnormality detection can be clearly specified from the variables included in the model.

However, in this method, an analyzing person needs to design a structural relation among variables before performing learning and define a regularization term reflecting the relation. Therefore, the method is not easy.

BRIEF DESCRIPTION OF THE DRAWINGS

FIG. 2 is a diagram showing an example of operation data stored in an operation data DB;

FIG. 3 is a diagram showing an example of structure data in a table format;

FIG. 5 is a diagram showing an example of group setting data in a table format;

FIG. 6 is a diagram showing an example of an evaluation function;

FIG. 7 is a diagram showing an example of a regularization term;

FIG. 8 is an example of another example of a regularization term;

FIG. 9 is a diagram showing an example of regularization rule data;

FIG. 10 is a diagram showing an example of coefficient output data;

FIG. 11 is a diagram showing an example of variable output data;

FIG. 16 is a flowchart of an example of operation by the information processing apparatus according to the first embodiment;

DETAILED DESCRIPTION

An information processing apparatus according to an embodiment of the present invention includes a group setting device configured to group a plurality of variables included in operation data into at least one type of groups, based on structure data representing a structural relation among the plurality of variables; a regularization term generator configured to generate at least one regularization term corresponding to the at least one type based on a coefficient for the variable included in the at least one type of groups, and a coefficient estimator configured to estimate, based on the operation data and an objective function including the at least one regularization term, values of a plurality of the coefficients for the plurality of variables.

Embodiments of the present invention are explained below with reference to the drawings.

First Embodiment

Figure 1:
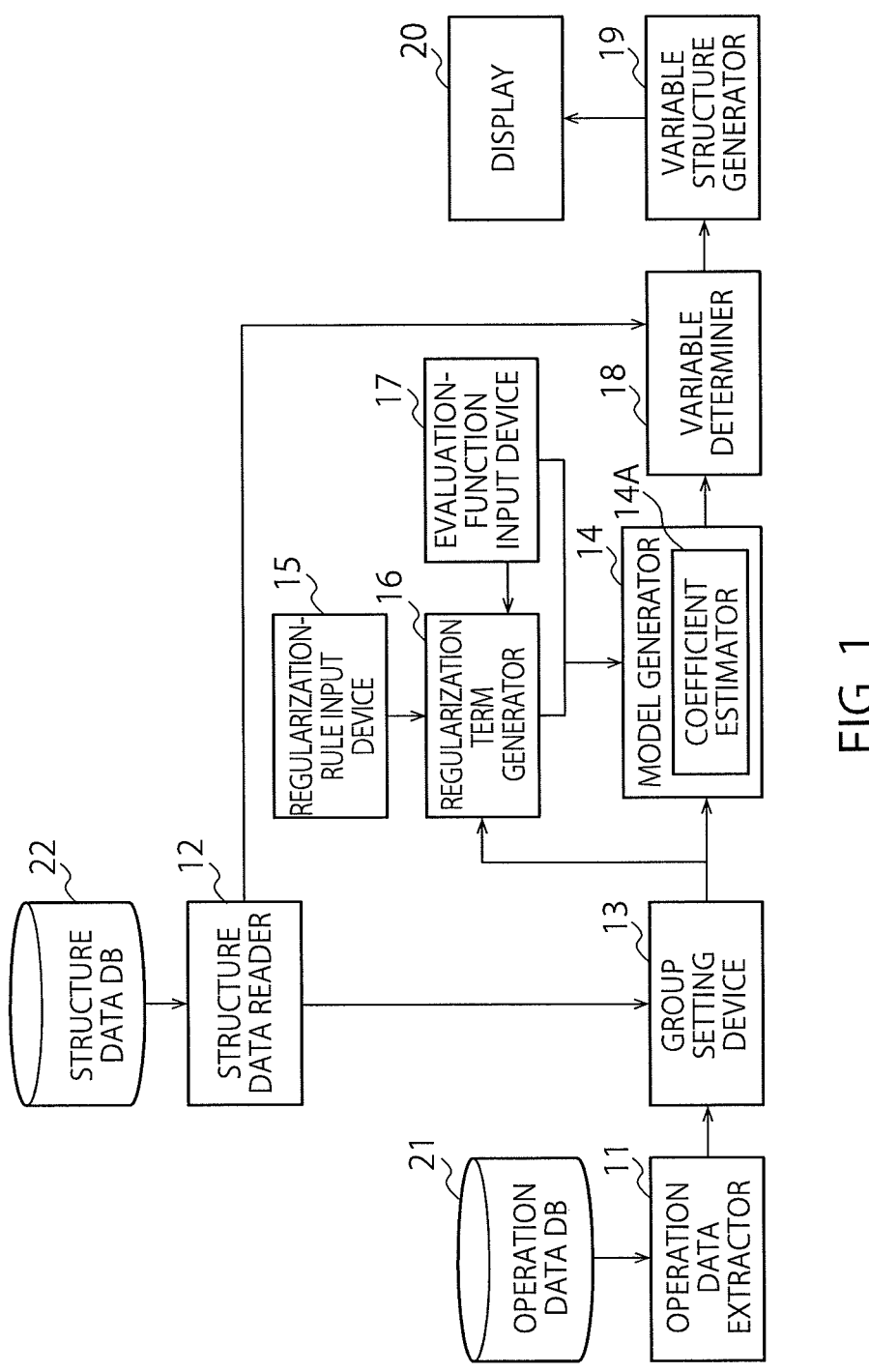
FIG. 1 is a configuration diagram of an information processing apparatus according to a first embodiment.

FIG. 1 is a configuration diagram of an information processing apparatus according to a first embodiment. The information processing apparatus specifies, based on operation data collected from a plurality of apparatuses, variables concerning factors of occurrence of predetermined events such as an abnormality, a failure, and performance deterioration of the apparatuses using statistical processing. Specifically, a model for regressing an objective variable with a plurality of explanatory variables is generated based on the operation data. Candidate variables of the factors are determined based on coefficients of the explanatory variables included in the regression model. The objective variable is a value for detecting occurrence of a predetermined event and corresponds to an output value of the model.

The information processing apparatus shown in FIG. 1 is, as an example, an apparatus realized by a computer and a monitor. The computer may be configured by two or more apparatuses. The apparatuses may be connected via a network such as the Internet. The information processing apparatus may be disposed on cloud and remotely operated by a user, who is an operator, of the information processing apparatus via the network such as the Internet.

The information processing apparatus shown in FIG. 1 includes an operation data extractor 11, a structure data reader 12, a group setting device 13, a model generator 14, a regularization-rule input device 15, a regularization term generator 16, an evaluation-function input device 17, a variable determiner 18, a variable structure generator 19, and a display 20. The information processing apparatus includes an operation data DB 21 and a structure data DB 22 as databases (DBs).

The operation data DB 21 has stored therein operation data collected from a plurality of apparatuses. As types of the operation data, there are operation presence/absence data representing presence or absence of operation of a plurality of components included in the apparatuses and sensor data of detection values of a plurality of sensors included in the apparatuses. There are history data of maintenance of the apparatuses and test data of the apparatuses. This embodiment is available in all of the operation data. The information processing apparatus may collect the operation data from the apparatuses using a wired or wireless communication device via a network such as the Internet. Alternatively, the operation data acquired from the apparatuses may be stored in a storage device such as a memory device in advance and installed in the operation data DB 21 from the storage device via wired connection or wireless connection. The operation data of the apparatuses may be collected at every fixed time or may be collected at timings when predetermined events occur in the apparatuses. The predetermined events may be any events: for example, the apparatuses have executed jobs, users of the apparatuses have performed predetermined operation, predetermined time has come, and vibration of a fixed level or more has been detected.

FIG. 2 shows an example of the operation data stored in the operation data DB 21. In this example, it is assumed that the operation data is collected from conveyance apparatuses (for example, a mail sorter). However, the apparatuses are not limited to these apparatuses and may be a copying machine, an air conditioner, a monitoring apparatus, and a mobile apparatus or may be other apparatuses.

The operation data includes date/time, an apparatus ID, a data ID, failure presence/absence, and a plurality of operation items. The date/time indicates time when the operation data is acquired. The failure presence/absence and the plurality of operation items correspond to, as an example, a plurality of variables or a plurality of feature values included in the operation data. Instead of the failure presence/absence, presence or absence of an abnormality, a performance value of an apparatus, a monitoring value for determining presence or absence of occurrence of an abnormality, or the like may be used.

The apparatus ID is an identifier of an apparatus from which the operation data is acquired. The data ID is an identifier of the operation data. The failure presence/absence indicates whether the apparatus is broken down. Information concerning the failure presence/absence may be directly acquired from the apparatus when the information can be acquired from the apparatus. When the information cannot be directly acquired from the apparatus, an administrator of the apparatus may determine presence or absence of a failure by inspecting the apparatus and register a result of the determination.

"1" or "0" is stored in each operation item. As an example, the operation data shown in FIG. 2 is acquired when each apparatus executes a certain job. In this case, "1" means that operation of the item is performed when the job is executed. "0" means that the operation of the item is not performed when the job is executed. When the operation data is acquired at a fixed time interval and the operation of the item is performed within the fixed time, a value of the item is "1". When the operation of the item is not performed within the fixed time, the value of the items is "0".

For example, operation data of ID=1 of an apparatus A means that a company A motor operates, a reflector operates, a pickup unit operates, and a belt operates in a high-speed zone. The apparatus A is not mounted with a company B motor and a company C motor. Therefore, values of items of the motors are always 0.

An operation item about whether motor operation is performed is present separately from the operation of the motor of each of the companies. A value of the item is acquired from an apparatus. In the operation data of ID=1, the motor operation is "1". If the company A motor is operating, the motor operation is naturally present. Therefore, if the motor of each of the companies is operating, the item of the motor operation is "1". The item of the motor operation may be absent.

It is prescribed in specifications that a speed zone of the belt of the apparatus A is a high-speed zone. Therefore, when the belt operates, a belt speed zone: high is always 1 and a belt speed zone: medium and a belt speed zone: low are always 0. However, when the speed zone of the belt can be changed to high speed, medium speed, and low speed according to conditions, an item in which 1 is set may change according to a speed zone at that time.

In this example, a value of the operation item is "1" or "0". However, the value may be a continuous value such as a measurement value or a calculation value of a sensor. For example, operation items such as speed of the motor and speed of the belt may be present. A value of the speed of the motor, a value of the speed of the belt, or the like may be stored.

The operation data extractor 11 extracts operation data used for processing in this embodiment from the operation data DB 21. The extraction of operation data may be performed by, for example, the user designating a period in which operation data is extracted and extracting the operation data in the period. The user may designate a plurality of apparatuses from which operation data is extracted and extract the operation data of the designated apparatuses. The user, who is the operator, of the information processing apparatus may optionally designate operation data to be extracted and extract the designated operation data. All operation data in the operation data DB 21 may be extracted. The extraction of operation data may be performed by other methods.

The structure data DB 22 stores structure data representing a structural relation among a plurality of variables (data items). Examples of the structural relation include "is-a", "part-of", "has<attribute>-of", and "has-effect-of".

Examples of a format of the structure data include an ontology format, an RDF (Resource Description Framework) format, a network format, a tree format, and a table format. However, the format of the structure data may be formats other than the above as long as the structural relation can be represented.

FIG. 3 shows an example of the structure data in the table format. This table includes a first data name, a relation, and a second data name. Names of variables are described in a row of the first data name and a row of the second data name. A structural relation between two variables is stored in the "relation". The variables of the operation data shown in FIG. 2 are associated with any one of the variables in the structure data. In this embodiment, the variables of the operation data are associated with the variables having the same names as the names of the operation data. However, the names do not need to be the same as long as the association is possible. The structure data may include variables not included in the operation data.

The "is-a" means that a variable of the first data name is specialization of a variable of the second data name. The variable of the first data name belongs to a class of the variable of the second data name. For example, all of a company A motor operation, a company B motor operation, and a company C motor operation are linked to a motor operation in the "is-a" relation. In other words, the company A motor operation, the company B motor operation, and the company C motor operation belong to a class of the same motor operation. The company A motor operation, the company B motor operation, and the company C motor operation can be respectively considered instances of the motor operation. In this case, the company A motor operation, the company B motor operation, and the company C motor operation form the same group in that the company A motor operation, the company B motor operation, and the company C motor operation belong to the same class.

The "part-of" means that the variable of the first data name is a part of the variable of the second data name. In other words, the variable of the second data name owns the variable of the first data name. For example, all of a belt operation, a roller operation, and a motor operation are linked to a lane conveyance unit operation in the "part-of" relation. In other words, all of the belt operation, the roller operation, and the motor operation are parts of the lane conveyance unit operation. When represented in a tree structure, all of the belt operation, the roller operation, and the motor operation can be considered child nodes of the lane conveyance unit operation. In this case, the belt operation, the roller operation, and the motor operation form the same group in that the belt operation, the roller operation, and the motor operation belong to the same high-order node (in this example, parent node).

The "has<attribute>-of" means that the variable of the first data name is an attribute of the variable of the second data name. For example, the company A motor operation is linked to the belt speed zone: high by the "has<attribute>-of". In other words, the belt speed zone: high is an attribute of the company A motor. In this case, the company A motor is equivalent to a variable at a reference source and the belt speed zone: high is equivalent to a variable at a reference destination. The company A motor and the belt speed zone: high form the same group in that the company A motor and the belt speed zone: high are in a reference relation. Similarly, the company B motor operation is linked to the belt speed zone: medium by the "has<attribute>-of". In other words, the belt speed zone: medium is an attribute of the company B motor operation. The company B motor is equivalent to a variable at a reference source and the belt speed zone: medium is equivalent to a variable at a reference destination. In this case, the company B motor operation and the belt speed zone: medium form the same group in that the company B motor operation and the belt speed zone: medium are in a reference relation.

The "has-effect-of" means that the variable of the first data name affects the variable of the second data name. For example, the speed value of the motor is linked to the speed value of the belt by the "has-effect-of". In other words, the speed value of the motor affects the speed value of the belt driven by the motor. In this case, the speed value of the motor is equivalent to a variable at a reference source and the speed value of the belt is equivalent to a variable at a reference destination. The speed value of the motor and the speed value of the belt form the same group in that the speed value of the motor and the speed value of the belt are in a reference relation.

The "has<attribute>-of" and the "has-effect-of" are described as examples of the reference relations. However, other reference relations may be defined. For example, <attribute> may be specialized as "has speed zone-of". The "has speed zone-of" may be used instead of the "has<attribute>>-of" shown in FIG. 3.

Figure 4:
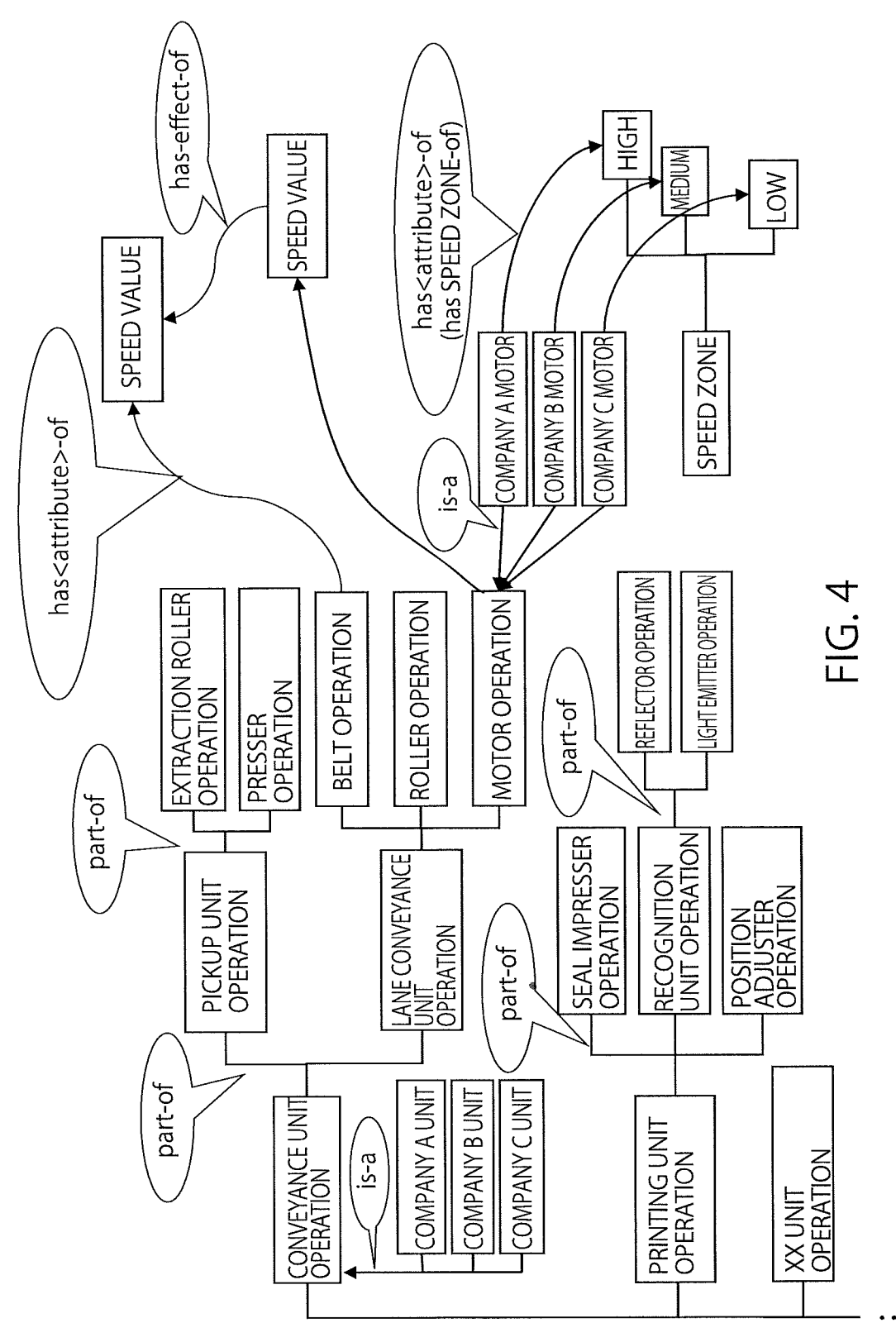
FIG. 4 is a diagram showing an example of structure data based on a tree structure.

FIG. 4 shows an example of structure data based on a tree structure. Variables (data names) are represented by rectangles. Relations among the variables are indicated by balloons.

Variables of a plurality of low-order nodes attached with the "part-of" with respect to one high-order node are in the same hierarchical relation with respect to a variable of the high-order node. The variables of the plurality of low-order nodes form the same group. The same hierarchical relation can be defined as a relation wider than a parent-child relation by tracing the "part-of" for two generations or more. For example, all of nodes of the belt operation, the roller operation, the motor operation, an extraction roller operation, and a presser operation are low-order nodes of a conveyance unit operation, which is a node higher in order by two generations. Therefore, variables of the belt operation, the roller operation, the motor operation, the extraction roller operation, and the presser operation are in the same hierarchical relation with the node of the conveyance unit operation. In other words, the belt operation, the roller operation, the motor operation, the extraction roller operation, and the presser operation form the same group with respect to the node of the conveyance unit operation. In this way, one variable can belong to a plurality of groups. In other words, one variable can belong to both of a subtree and another subtree including the subtree.

A plurality of variables combined with a node of one variable by arrowed lines attached with the "is-a" belong to a class of the one variable. The plurality of variables are equivalent to instances at the time when the one variable is set as a class. The plurality of variables form the same group.

A relation between a variable of one node and variables of nodes combined with the node by arrowed lines attached with the "has<attribute>-of", the "has-effect-of", or the like corresponds to a reference relation. The variables combined by the arrowed lines form the same group.

As an example, the operation data includes at least a variable corresponding to a terminal node of a tree structure. In the example shown in FIG. 4, the operation data includes respective variables of the extraction roller operation, the presser operation, the belt operation, the roller operation, the motor operation, a reflector operation, and a light emitter operation. The operation data may or may not include values of variables of nodes higher in order than the terminal node as items of the operation data. In other words, variables corresponding to nodes other than the terminal node of the structure data may be present or may be absent in the operation data.

In this way, the structure data can be defined in any format such as a table format or a tree structure-based format.

The structure data reader 12 reads out the structure data from the structure data DB 22 and provides the structure data to the group setting device 13, the regularization term generator 16, and the variable determiner 18. The structure data reader 12 may convert the read structure data into a format processable by a processor at a provision destination and provide the structure data after the conversion. For example, the structure data reader 12 may read the tree structure-based structure data shown in FIG. 4 and convert the structure data into the structure data of the table format shown in FIG. 3. For example, the structure data reader 12 may convert the tree structure-based structure data into the RDF format. The conversion of the structure data may be performed by other methods.

The group setting device 13 groups, based on the structure data provided from the structure data reader 12, the plurality of variables included in the operation data under a grouping standard and generates a plurality of groups of at least one group type. Consequently, the group setting device 13 generates a plurality of groups of at least one group type respectively including the variables. The group setting device 13 sets, for the variables, labels for identifying the groups to which the variables belong. The group setting device 13 sets the labels for the variables in this way to generate group setting data.

As an example of the group type, there is a group (a class-relation group or a class group) obtained by integrating a plurality of variables (a plurality of variables in an is-a relation) corresponding to a plurality of instances of classes represented by variables into one.

As another example of the group type, there is a group (a hierarchical-relation group or a hierarchy group) obtained by integrating, when a structural relation among a plurality of variables is represented in a tree structure-based format, a plurality of variables corresponding to a plurality of low-order nodes having a common high-order node into one.

As another example of the group type, there is a group (a reference-relation group or a reference group) obtained by integrating a plurality of variables corresponding to a plurality of variables having a reference relation into one.

A format of group setting data may be any format such as a table, a list, a dictionary, or a tuple. The group setting device 13 provides the generated group setting data to the model generator 14 and the regularization term generator 16.

An example of the group setting data is shown in a table format in FIG. 5. The same label is given to a plurality of variables belonging to the same group as a group ID. In the example shown in FIG. 5, the same label beginning with G is given to a plurality of variables belonging to the same group. A value of the label may be any value as long as the group can be distinguished.

For example, since the company A motor, the company B motor, and the company C motor belong to the same group, a label G1 is given to the company A motor, the company B motor, and the company C motor (a group belonging to the same class). Since the belt operation, the roller operation, and the motor operation belong to the same group, a label G2 is given to the belt operation, the roller operation, and the motor operation as a group ID (a group belonging to the same parent node, that is, a group in the same hierarchical relation). Since the belt operation, the roller operation, motor operation, the conveyance roller operation, and the presser operation belong to the same group, a label G3 is given to the belt operation, the roller operation, the motor operation, the conveyance roller operation, and the presser operation as a group ID (a group belonging to the same high order and in the same hierarchical relation). Since the company A motor and the speed zone: high are in a reference relation and belong to the same group, the same label beginning with G12 is given to the company A motor and the speed zone: high. In this case, brunch numbers for identifying a reference source and a reference destination may be added to the label. In the example shown in FIG. 5, a branch number "−1" representing the reference source is added to the company A motor and a branch number "−2" representing the reference destination is added to the speed zone: high. A configuration not distinguishing the reference source and the reference destination is also possible. The reference source and the reference destination may be distinguished in the order of rows of the table.

The evaluation-function input device 17 receives an input of an evaluation function from the outside. The outside may be an input device (a keyboard, a mouse, a touch panel, or the like) operated by the user, may be a storage device storing the evaluation function, or may be a communication device connected via a network. The storage device may be provided on the inside of the information processing apparatus or may be a device externally connected via a connection interface. The evaluation function is defined using a plurality of variables included in the operation data and a plurality of coefficients for the plurality of variables.

The evaluation function is a function for generating an objective function by being combined with a regularization term. The objective function is, as an example, a function serving as a base for evaluating a matching degree of a model for regressing, based on explanatory variables of a plurality of variables (operation items) of operation data and an objective variable (for example, a failure item) of the operation data, the objective variable from the plurality of explanatory variables. Coefficients of the explanatory variables are estimated by optimizing (for example, minimizing or maximizing) the objective function. The explanatory variable, the estimated coefficient of which is zero, means that the explanatory variable is not used in the model. In other words, the explanatory variable, the coefficient of which is not zero, is the explanatory variable used in the model. However, a configuration for not using the explanatory variable, the coefficient of which is equal to or smaller than a threshold, in the model even if the coefficient of the explanatory variable is not zero is also possible. The model may be any model such as a linear regression model, a logistic regression model, or a neural network.

The evaluation-function input device 17 may receive an input of designation of an item set as an objective variable and an item set as an explanatory variable in the operation data. For example, the user designates a failure item as the objective variable and designates an operation item as the explanatory variable. When the operation data includes an item such as presence or absence of an abnormality, a performance value of an apparatus, or a monitoring value for determining presence or absence of occurrence of an abnormality, the item may be set as the objective variable.

Examples of evaluation functions are shown in FIGS. 6A to 6D. When the model is the linear regression model and all the explanatory variables do not belong to a plurality of groups, that is, variables do not overlap among the groups (for example, all the groups are only class groups), a square error function shown in FIG. 6A can be used as the evaluation function. A value of a product-sum operation of an explanatory variable and a coefficient is subtracted from "y" and a result of the subtraction is squared. In the same case, when the model is the logistic regression model, a log-likelihood function shown in FIG. 6C can be used as the evaluation function. "$\phi$" represents a function (a logistic function) of the logistic regression model.

When at least one explanatory variable belonging to a plurality of groups in common is present, that is, explanatory variables overlap among the groups, a square error function (a tree structure) shown in FIG. 6B can be used as the evaluation function. In this evaluation function, a product-sum operation of an explanatory variable and a coefficient is calculated for each of the groups, results of the product-sum operation are summed among the groups, a summed value is subtracted from "y", and a result of the subtraction is squared. In the same case, when the model is the logistic regression model, a log-likelihood function shown in FIG. 6D can be used as the evaluation function.

As the evaluation functions shown in FIGS. 6A to 6D, "y" corresponds to an objective variable. "X" represents a vector including a plurality of explanatory variables and $\beta$ represents a vector including parameters (coefficients) of the explanatory diagrams included in the vector X. There are L explanatory variables in total. "$\beta$" is undecided at the present point in time. "m" of the evaluation functions shown in FIGS. 6B and 6D represents a group. When groups G1 to G20 are present, this means that a sum of m=G1 to G20 is calculated. "T" of the evaluation function shown in FIG. 6D represents transposition of a matrix. "i" of the evaluation functions shown in FIGS. 6C and 6D identifies operation data.

The determination example of the evaluation functions is an example. Other methods may be used. For example, a second term (a term subtracted from "y") in parentheses of an expression shown in FIG. 6A or 6B may be arranged as appropriate. For example, "$\Sigma X\beta$" may be applied only among groups having overlap of variables and "$X\beta$" shown in FIG. 6A may be applied to groups not having overlap of variables to define an evaluation function $(y-X_i\beta_i-\Sigma X_i\beta_j)^2$. The evaluation function may be defined by other methods.

The regularization term generator 16 receives the group setting data from the group setting device 13 and generates, based on the group setting data, a regularization term serving as an element forming an objective function. The regularization term generator 16 generates the regularization term for each of the group types (the class group, the hierarchy group, and the reference group). More specifically, the regularization term generator 16 generates, based on coefficients for variables included in the groups belonging to the group types, regularization terms corresponding to the group types. The model generator 14 explained below generates an objective function based on the generated regularization term and the evaluation function received by the evaluation-function input device 17.

FIGS. 7A to 7C show examples of regularization terms. FIG. 7A shows a regularization term of Group Lasso. FIG. 7B shows a regularization term of Overlapping Group Lasso. FIG. 7C shows a regularization term of Clustered Lasso.

For the class group (a group including a plurality of explanatory variables belonging to the same class), since there is no overlap of the explanatory variables among groups, the regularization term of Group Lasso shown in FIG. 7A is generated. In the regularization term, "g" represents a group, "G" represents a set of groups, and "$\lambda_g$" represents a regularization parameter (a hyper parameter) determining strength of regularization. In the regularization term of Group Lasso, an L2 norm ($\|\beta^g\|_2$) is calculated for each of the groups using coefficients (weights) of a plurality of explanatory variables belonging to the group. A sum of calculated L2 norms is calculated (Group Lasso). This is equivalent to calculating L1 norms of a plurality of groups. "$\beta^g$" represents a vector including coefficients of a plurality of explanatory variables belonging to a group g. "$\|\beta^g\|_2$" represents squaring and summing elements in the vector $\beta^g$ and calculating a square root of a summed value (the L2 norm).

For the hierarchy group, since there is overlap of explanatory variables among groups, the regularization term of Overlapping Group Lasso shown in FIG. 7B is generated. In the regularization term, "t" represents a group, "T" represents a set of groups, and "$\lambda_t$" represents a regularization parameter (a hyper parameter) determining strength of regularization. In the regularization term of Overlapping Group Lasso, the L2 norm is calculated for each of the groups using coefficients (weights) of a plurality of explanatory variables belonging to the group. A sum of L2 norms is calculated (Overlapping Group Lasso). This is equivalent to calculating L1 norms for a plurality of groups. "$\|\beta^t\|_2$" represents squaring and summing elements in the vector $\beta^t$ and calculating a square root of a summed value (the L2 norm). When a hierarchy group without overlap in explanatory variables is present, the regularization term of Group Lasso may be generated for the hierarchy group.

For the reference group, the regularization term of Clustered Lasso shown in FIG. 7C is generated. In the regularization term, "$\lambda_p$" represents a regularization parameter (a hyper parameter) determining strength of regularization. In the regularization term of Clustered Lasso, a sum of values obtained by multiplying an L2 norm of a difference between coefficients (weights) of paired variables by reference coefficients is calculated. In the regularization term, "(j, k)" represents a group of reference relations and "p" represents a set (a link set) of groups of reference relations. In the regularization term, "j" identifies a variable at a reference source and "k" identifies a variable at a reference destination. "$\beta_j$" represents a coefficient of the variable at the reference source and "$\beta_k$" represents a coefficient of the variable at the reference destination. In the regularization term, a size of "p" corresponds to the number of the groups of the reference relations. In the regularization term, "$w_{j,k}$" represents a coefficient. A configuration for not providing "$w_{j,k}$" (that is, setting all "$w_{j,k}$" to 1) is also possible.

FIGS. 8A and 8B show examples of other regularization terms. FIG. 8A shows a regularization term of L2 (Ridge). FIG. 8B shows a regularization term of L1 (Lasso). In the regularization terms, "$\lambda_r$" and "$\lambda_l$" represent regularization parameters (hyper parameters) determining strength of regularization.

The regularization term of L2 (Ridge) calculates an L2 norm ($\|\beta_s\|_2$) based on a coefficient of an explanatory variable set as a target of regularization. In the regularization term, "$\beta_s$" represents the explanatory variable set as the target of the regularization. "$\|\beta_s\|_2$" represents squaring and summing "$\beta_s$" and calculating a square root of a summed value (the L2 norm). As an example, the regularization term of L2 (Ridge) can be used for explanatory variables in a reference relation (that is, belonging to a reference group). In this case, the explanatory variables in the reference relation (an explanatory variable at a reference source and an explanatory variable at a reference destination) are respectively represented as "$\beta_s$". The regularization term shown in FIG. 7C and the regularization term shown in FIG. 8A may be properly used according to a type of the reference relation. Generation of the regularization term of L2 (Ridge) for all explanatory variables of the operation items included in the operation data is not excluded.

The regularization term of L1 (Lasso) calculates an L1 norm ($\|\beta_h\|_1$) based on a coefficient of an explanatory variable set as a target of regularization. "$\beta_h$" represents the explanatory variable set as the target of the regularization. "$\|\beta_h\|_1$" represents summing "$\beta_h$" and calculating a square root of a summed value (the L1 norm). As an example, the L1 (Lasso) regularization term can be generated for all the explanatory variables of the operation term included in the operation data. In this case, all the explanatory variables are respectively represented as "$\beta_h$". The regularization term of L1 (Lasso) may be generated for explanatory variables in a reference relation (belonging to a reference group). The regularization term shown in FIG. 7C and the regularization terms shown in FIGS. 8A and 8B may be properly used according to a type of the reference relation.

In this embodiment, it is assumed that at least one of the regularization terms shown in FIGS. 7A to 7C is generated. When the regularization term shown in FIG. 8A or 8B is generated, the regularization term is generated together with at least one of the regularization terms shown in FIGS. 7A to 7C. However, the generation of regularization terms is not limited to this method.

The regularization-rule input device 15 receives, from the outside, an input of regularization rule data designating a structural relation, a type of regularization, and a regularization parameter. The outside may be an input device (a keyboard, a mouse, a touch panel, or the like) operated by the user, may be a storage device storing an evaluation function, or a communication device connected to the information processing apparatus via a network. The storage device may be provided on the inside of the information processing apparatus or may be a device externally connected via a connection interface.

An example of the regularization rule data is shown in FIG. 9. A plurality of rules associating relations, types of regularization, and values of a regularization parameter λ are stored.

A first row prescribes that the regularization term of Group Lasso is generated and the regularization parameter is set to 0.2 for groups (class groups) in an "is-a" relation.

A second row prescribes that the regularization term of Overlapping Group Lasso is generated and the regularization parameter is set to 0.1 for groups (hierarchy groups) based on a "part-of" relation.

A third row prescribes that the regularization term of Clustered Lasso is generated and the regularization parameter is set to 0.3 for a reference group of "has<attribute>-of".

A fourth row prescribes an exception applied when <attribute> of "has<attribute>-of" is "speed zone". In this case, the fourth row prescribes that the L2 regularization term is generated and the regularization parameter is set to 0.4.

A fifth row prescribes that the regularization term of Clustered Lasso is generated and the regularization parameter is set to 0.3 for a reference group of "has-effect-of".

A sixth row prescribes that the L1 regularization term is generated and the regularization parameter is set to 0.2 for all variables (objects) of the operation item in the operation data.

A part of the rules shown in FIG. 9 may be absent. For example, all or a part of the rules in the fourth to sixth rows may be absent.

A coefficient estimator 14A of the model generator 14 generates, as an objective function based on the regularization term generated by the regularization term generator 16, an objective function including the regularization term and the evaluation function received by the evaluation-function input device 17. The objective function includes the regularization term, a plurality of explanatory variables, and a plurality of coefficients for the plurality of explanatory variables. The coefficient estimator 14A estimates coefficients (weights) for the explanatory variables by optimizing (for example, maximizing or minimizing) an output value of the objective function.

As an example, when the evaluation function is a square error function (for example, FIG. 6A or 6B, or when FIG. 6A or 6B is arranged), the coefficient estimator 14A generates the objective function by calculating a sum of the evaluation function and the regularization term and estimates a coefficient of a variable according to an algorithm for minimizing the objective function.

When the evaluation function is a log-likelihood function, the coefficient estimator 14A generates the objective function by subtracting the regularization term from the evaluation function and estimates a coefficient of a variable according to an algorithm for maximizing the objective function.

With the regularization term, coefficients of all explanatory variables in a hierarchy group and a class group with small contribution to an output of the objective function tend to be zero. Alternatively, among the explanatory variables in the groups, values of explanatory variables with large contribution tend to be large and values of coefficients of explanatory variables with small contribution tend to be small. The explanatory variables used in the model can be narrowed down by not using variables, coefficients of which are zero, as the explanatory variables of the model. A configuration for not using, as the explanatory variables of the model, explanatory variable, coefficients of which are not zero but absolute values of which are small, (for example, explanatory variables, absolute values of coefficients of which are equal to or smaller than a threshold) is also possible. The model generator 14 generates, based on the explanatory variables narrowed down in this way and coefficients of the explanatory variables, a regression model for regressing the objective variable from the explanatory variables.

An example of an objective function f(x) generated by the coefficient estimator 14A is shown in the following expression.

[Math 1]

$$f(x) = \left(y - \sum_m X^m \beta^m\right)^2 + \tag{1}$$

$$\sum_{g \in G} \lambda_g \|\beta^g\|_2 + \sum_{t \in T} \lambda_t \|\beta^t\|_2 + \sum_{(j,k) \in P} \lambda_p w_{j,k} \|\beta_j - \beta_k\|_2$$

In this example, G groups (class groups) in a class relation, T groups (hierarchy groups) in a hierarchical relation, and p reference groups are present. The regularization term of Group Lasso is generated for the g class groups. The regularization term of Overlapping Group Lasso is generated for t hierarchical groups. The regularization term of Clustered Lasso is generated for p reference groups. "λ" in the regularization terms is determined from the regularization rule data explained above.

In the expression, "$X^m \beta^m$" includes a case of one explanatory variable $x^m$ and one coefficient of the explanatory variable $x^m$. In particular, in Clustered Lasso, in application of a second term ($X^m \beta^m$) of the evaluation function in Expression (1), each one variable included in a variable set P and a coefficient of the variable are considered to correspond to the one explanatory variable $x^m$ and the one coefficient of the explanatory variable $x^m$ and form one group. When two or more groups equivalent to the second term ($X^m \beta^m$) of the evaluation function overlap among a class group set G, a hierarchy group set (a tree structure set) T, and a reference group set (a set of variables) p, the groups are erased to be one. In other words, a sum of groups obtained by excluding the overlapping groups from a set of "Xβ" is represented as "m".

Not all of the three regularization terms need to be present. For example, at least one of the three regularization terms can be absent. In Expression (1), an L2 (Ridge) regularization term and an L1 (Lasso) regularization term are not included. However, at least one of the L2 (Ridge) regularization term and the L1 (Lasso) regularization term may be further included.

The square error function shown in FIG. 6B is used as the evaluation function in Expression (1). In this example, the evaluation function is $(y-\Sigma X\beta)^2$. However, as explained above, functions of other forms are also possible. The log-likelihood function shown in FIG. 6D can be used instead of the square error function.

The coefficient estimator 14A estimates coefficients (represented as "$\beta i$") of explanatory variables (represented as "$xi$") by minimizing the objective function f(x). Consequently, as an example, all coefficients of explanatory variables in a hierarchy group and a class group with smallest contribution to an output of an objective function are adjusted to be zero (or small values) or adjusted such that, among the explanatory variables in the groups, values of coefficients of explanatory variable with large contribution are large and values of coefficients of explanatory variables with small contribution are small. For a reference group, coefficients of explanatory variables at a reference source and a reference destination are adjusted to be the same values (or close values). In other words, the coefficients of the explanatory variables are adjusted such that, if one of the reference source and the reference destination is important, the other is also important.

FIG. 10 shows, as coefficient output data, an example of values of coefficients of explanatory variables estimated by the model generator 14. The company A motor, the company B motor, and the company C motor form the same class group. In the group, a value of a coefficient of the company A motor is large and values of coefficients of the company B motor and the company C motor are small. Similarly, a company A unit, a company B unit, and a company C unit form the same class group. In the group, values of coefficients of the company A unit and the company C unit are large and a value of a coefficient of the company B unit is small. The belt operation, the roller operation, and the motor operation form the same hierarchy group. Values of coefficients of all of the belt operation, the roller operation, and the motor operation are a fixed value or more. In this example, a group in which coefficients of all explanatory variables are zero is absent. However, such a group could be present.

The model generator 14 generates, based on the values of the coefficients of the explanatory variables, a model for predicting an objective variable from a plurality of explanatory variables. As an example, the model generator 14 selects all explanatory variables, values of coefficients of which are not zero, and generates a model based on all the selected explanatory variables and the coefficients of the explanatory variables. Alternatively, the model generator 14 may select explanatory variables, values of coefficients of which are larger than a threshold, and generate a model based on the selected explanatory variables and coefficients of the explanatory variables. As an example, a form of a function of the model depends on the evaluation function used for the generation of the objective function. For example, when Expression (1) is used as the objective function, a function of a model to be generated is as follows:

[Math 2]

$$y = \sum_n X^n \beta^n \qquad (2)$$

In the above expression, "n" represents a group. In Expression (2), n groups are present. In Expression (1), m groups are present. If all the groups are selected, n=m. A size (the number of elements) of each of the vector X and the vector $\beta$ corresponds to the number of explanatory variables selected in the groups.

When the log-likelihood function shown in FIG. 6D is used as the evaluation function, an example of a function of a model to be generated is as follows. In the following expression, "n" is the same as "n" in Expression (2).

[Math 3]

$$y = \frac{1}{1+e^{-z}}, z = \sum_n (\beta^x)^T X^n \qquad (3)$$

In this embodiment, the generated model is not used for processing later. Therefore, the generation of a model may be omitted and only the coefficient output data may be generated.

The variable determiner 18 adds information concerning a group ID, an adjacent data name (an adjacent variable name), and a structural relation to the coefficient output data (the variable name and the coefficient) generated by the model generator 14. These kinds of information to be added are specified based on the structure data (see FIGS. 3 and 4) and the group setting data (see FIG. 5). The adjacent data name (the adjacent variable name) is a name of a variable (the adjacent variable) linked by the structural relation and corresponds to the second data name linked by the "relation" shown in FIG. 3. The coefficient output data after these kinds of information are added is referred to as variable output data.

An example of the variable output data generated by adding the above-explained information to the model output data shown in FIG. 10 is shown in FIG. 11. The structure relation and the adjacent data name (the second data name) in the structure data shown in FIG. 3 or 4 and the group ID of the group setting data shown in FIG. 5 are added to the model output data shown in FIG. 10.

The variable structure generator 19 determines, as drawing variables, the data name (the variable) and the adjacent data name (the adjacent variable name) of the variable output data. The variable structure generator 19 generates a graph (variable structure data) representing a relation between the drawing variables. If the relation between the drawing variables is a group belonging to the same class, the relation is drawn as a group of a class relation (a class group). If the relation between the drawing variables is a group belonging to the same hierarchy, the relation is drawn as a group of a hierarchical relation (a hierarchy group). If the relation between the drawing variables is a group of a reference relation, the relation is drawn as a network structure in which the drawing variables are connected by a link (for example, an arrowed line). When a variable, a value of a coefficient of which is equal to or smaller than a threshold, is present information identifying the presence of the variable may be drawn. A variable, a coefficient of which is zero, may be set as a drawing variable to be drawn and, at the same time, information identifying that the variable is not selected may be drawn.

The display 20 displays a graph drawn by the variable structure generator 19 to be visually recognizable by the user.

Figure 12:
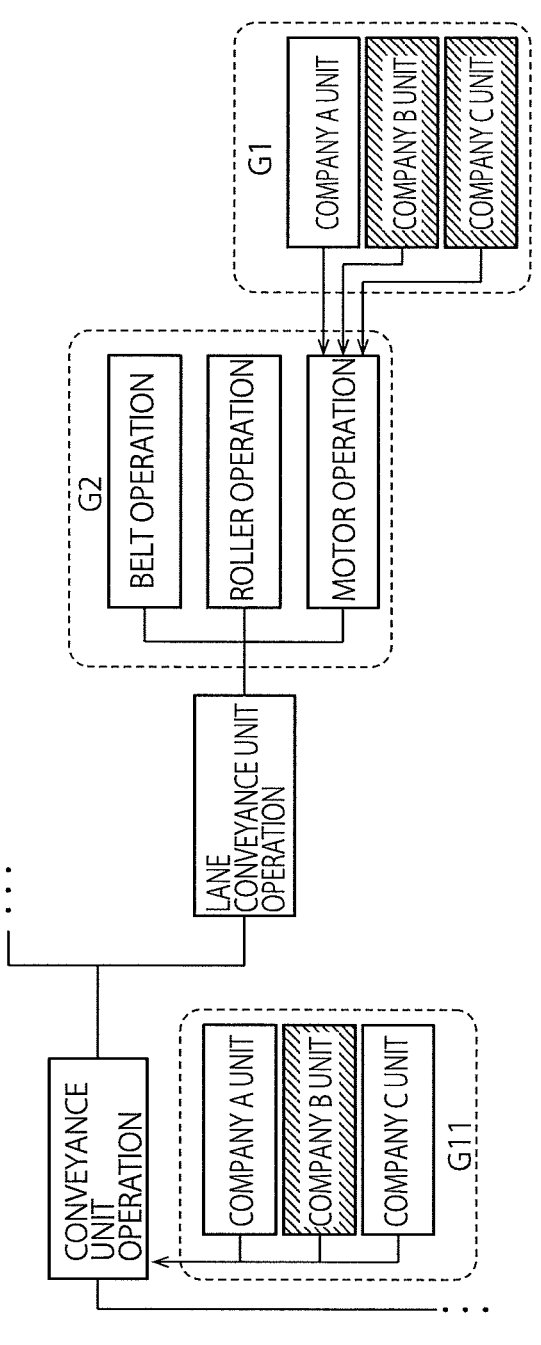
FIG. 12 is a diagram showing an example of display as a graph of variable structure data.

An example of a part of a graph drawn by the variable structure generator 19 based on the variable output data shown in FIG. 11 is shown in FIG. 12. Variables are drawn according to a structural relation. The company A motor, the company B motor, and the company C motor are surrounded by broken line frames because the company A motor, the company B motor, and the company C motor form a group (G1) belonging to the same class (the motor operation). However, since values of coefficients of the company B motor and the company C motor are equal to or smaller than a threshold, hatching is drawn in nodes as information identifying that the values are equal to or smaller than the threshold. A configuration for not drawing the company B motor and the company C motor is also possible. The company A motor, the company B motor, and the company C motor are combined with the motor operation by arrowed lines because the company A motor, the company B motor, and the company C motor are in an is-a relation with the motor operation.

The belt operation, the roller operation, and the motor operation are surrounded by broken line frames because the belt operation, the roller operation, and the motor operation form a group (G2) belonging to the same hierarchy. The belt operation, the roller operation, and the motor operation are drawn in a format of a tree structure (as child nodes when the lane conveyance unit operation is set as a parent node) because the belt operation, the roller operation, and the motor operation have a part-of relation with the lane conveyance unit operation. The lane conveyance unit operation is also drawn in the format of the tree structure with respect to the conveyance unit operation because the lane conveyance unit operation has the part-of relation with the conveyance unit operation. Both of the lane conveyance unit operation and the conveyance unit operation are variables absent in the operation data in the example of this embodiment.

The company A unit, the company B unit, and the company C unit are surrounded by broken line frames because the company A unit, the company B unit, and the company C unit form a group (G11) belonging to the same class (the conveyance unit operation). However, since values of coefficients of the company B unit and the company C unit are equal to or smaller than a threshold, hatching is drawn in nodes as information identifying that the values are equal to or smaller than the threshold. A configuration for not drawing the company B unit and the company C unit is also possible. Since the company A unit, the company B unit, and the company C unit are in an is-a relation with the conveyance unit operation, the company A unit, the company B unit, and the company C unit are combined with the conveyance unit operation by arrowed lines.

Only a part the drawing is shown in FIG. 12. However, portions not shown in FIG. 12 are drawn in the same manner.

Figure 13:
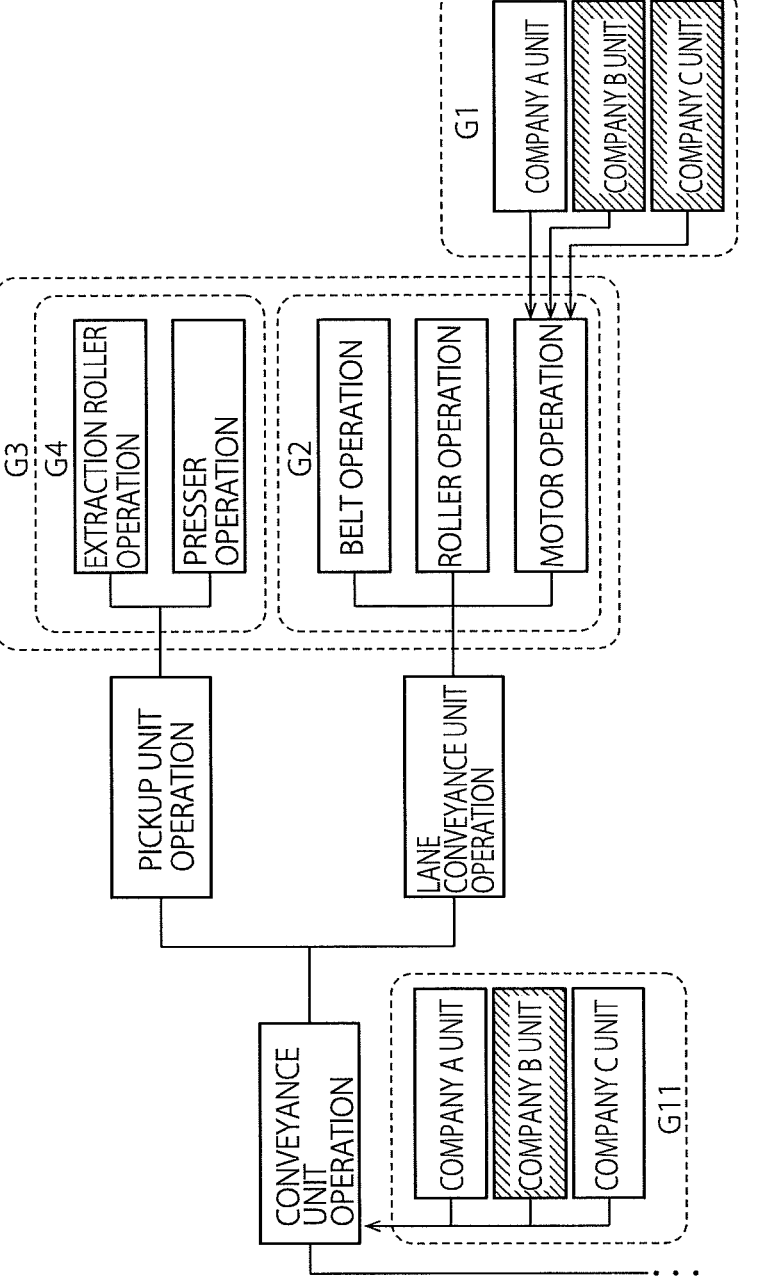
FIG. 13 is a diagram showing another example of display as a graph of variable structure data.

FIG. 13 shows another example of a graph drawn by the variable structure generator 19. An example in which both of explanatory variables of the extraction roller operation and the presser operation are selected is shown in FIG. 13. Otherwise, FIG. 13 is the same as FIG. 12. Nodes representing drawing variables may be colored. For example, different colors may be used for drawing variables not belonging to a plurality of groups and drawing variables belonging to the plurality of groups in common. For example, since the company A motor does not belong to the plurality of groups, the company A motor is drawn in a first color. Since the belt operation belongs to the group G2 and belongs to the group G3 (see FIG. 5), the belt operation is drawn in a second color different from the first color.

Figure 14:
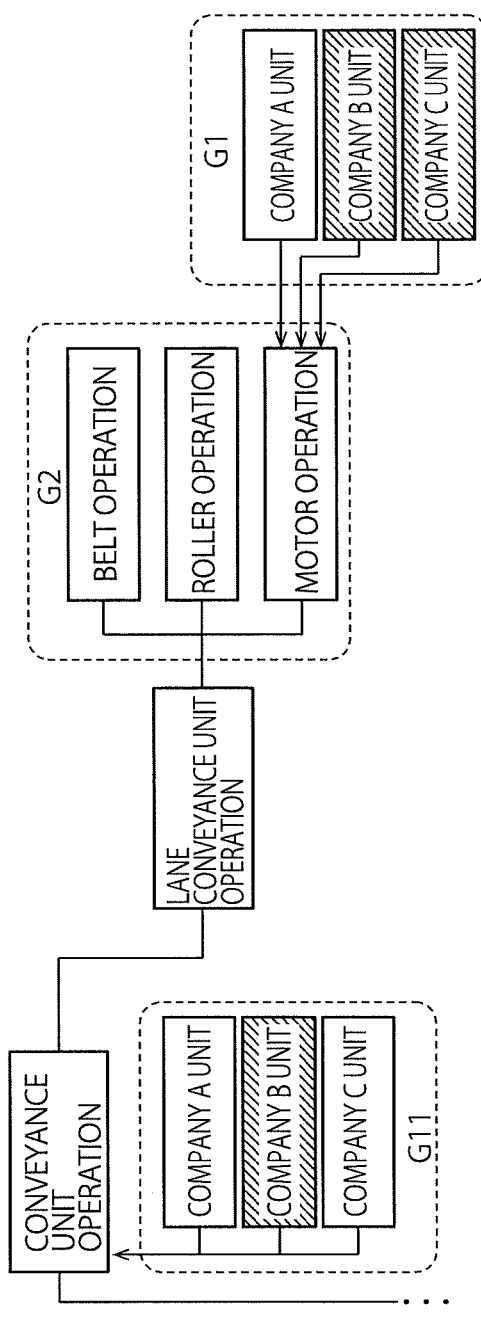
FIG. 14 is a diagram showing another example of display as a graph of variable structure data.

FIG. 14 shows another example of a graph drawn by the variable structure generator 19. An example in which coefficients of explanatory variables of the extraction roller operation and the presser operation are zero is explained.

Figure 15:
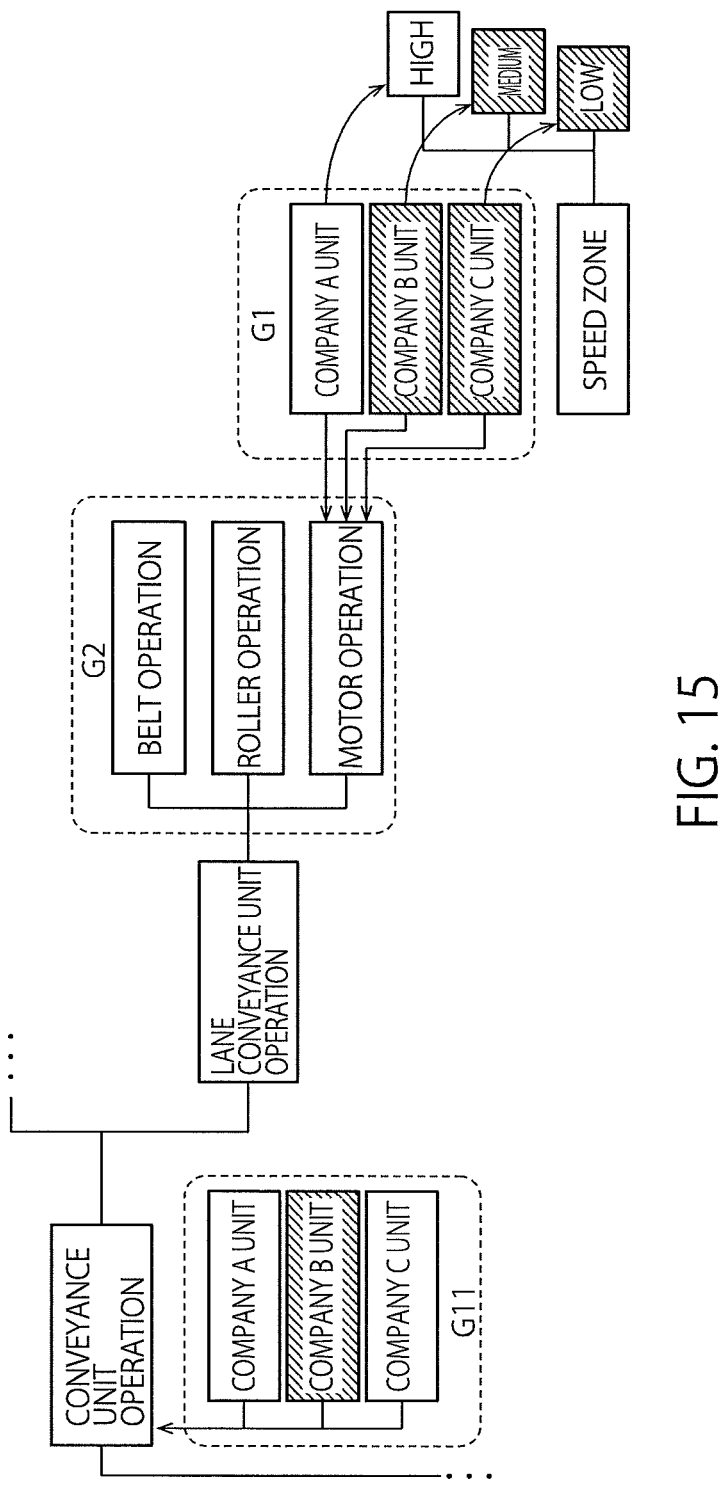
FIG. 15 is a diagram showing another example of display as a graph of variable structure data.

FIG. 15 shows another example of a graph drawn by the variable structure generator 19. The example is an example of a graph drawn when a variable of the speed zone: high is selected and coefficients of variables of the speed zone: medium and the speed zone: low are equal to or smaller than a threshold. Since the variables of the company A motor and the speed zone: high have a reference relation, a network structure in which the variables are connected by a link is formed. A relation between the company B motor and the speed zone: medium and a relation between the company C motor and the speed zone: low are drawn in the same manner. However, hatching is added in nodes of the speed zone: medium and the speed zone: low.

The user can easily grasp candidates of a factor of an abnormality, a failure, or the like by viewing a graph displayed on the display 20.

For example, in the example shown in FIG. 12, all of the belt operation, the roller operation, and the motor operation in the group G2 are selected. The user can judge that the lane conveyance unit operation corresponding to a parent node of the belt operation, the roller operation, and the motor operation is a candidate of the factor. If the motor operation is selected and the belt operation and the roller operation are not selected, the user can judge that the motor operation is a candidate of the factor of an abnormality, a failure, or the like. Since the coefficient of only the company A motor among the company motors is larger than the threshold, the user can judge that the company A motor is a candidate of the factor. Similarly, since the coefficients of only the company A unit and the company C unit among the company units are larger than the threshold, the user can judge that the company A unit and the company C unit are candidates of the factor.

For example, in the example shown in FIG. 13, since all of the belt operation, the roller operation, the motor operation, the extraction roller operation, and the presser operation in the group G3 are selected, the user can judge that the conveyance unit operation corresponding to a common high-order node of these operations is a candidate of the factor. Otherwise, FIG. 13 is the same as FIG. 12.

In the example shown in FIG. 14, since the pickup unit operation is not selected, the user can judge that the pickup unit operation can be excluded from candidates of the factor of the failure.

In the example shown in FIG. 15, since variables of the company A motor and the belt speed zone: high are respectively selected and the variables are linked by a reference relation, the user can judge that a motor having a high speed zone is a candidate of the factor. On the other hand, since coefficients of variables of the company B motor and the belt speed zone: medium are respectively equal to or smaller than the threshold, the user can judge that a motor, a speed zone of which is a medium degree, can be excluded from the candidates of the factor. Similarly, since variables of the company C motor and the belt speed zone: low are respectively equal to or smaller than the threshold, the user can judge that a motor, a speed zone of which is low, can be excluded from the candidates of the factor.

An administrator or a maintenance person for the apparatuses is capable of performing efficient inspections by inspecting, centering on a part determined as a candidate of a factor, an apparatus in which a failure or an abnormality occurs.

FIG. 16 is a flowchart of an example of operation by the information processing apparatus according to this embodiment. The order of steps of the flowchart is an example. The order of a part of the steps may be changed. For example, the order of step S2 and step S3 may be opposite.

The operation data extractor 11 extracts operation data from the operation data DB 21 (step S1).

The evaluation-function input device 17 receives an input of an evaluation function and supplies the input evaluation function to the regularization term generator 16 (step S2). As an example, the user creates and inputs the evaluation function or the information processing apparatus automatically creates and inputs the evaluation function. The evaluation function may be stored in the storage device in advance, read, and provided to the regularization term generator 16.

The structure data reader 12 reads structure data from the structure data DB 22 (step S3).

The group setting device 13 generates group setting data by setting, based on the structure data, for a plurality of variables in the operation data, the same label in a group of variables for identifying a group relation (step S4).

The regularization-rule input device 15 receives an input of regularization rule data and provides the input regularization rule data to the regularization term generator 16 (step S5). The regularization rule data may be stored in the storage device in advance, read, and provided to the regularization term generator 16.

The regularization term generator 16 creates, based on the regularization term rule data and the group setting data, a regularization term corresponding to a type and the like of a group (step S6).

The model generator 14 generates an objective function based on the regularization term and the evaluation function and estimates coefficients ($\beta$i) of explanatory variables (step S7). As an example, the model generator 14 generates the objective function according to a sum of the regularization term and the evaluation function.

The variable determiner 18 selects an explanatory variable based on the coefficients of the explanatory variables (step S8). In other words, the variable determiner 18 selects an explanatory variable, a value of a coefficient of which is not zero. The variable determiner 18 may not select an explanatory variable, a value of a coefficient of which is equal to or smaller than a threshold. The variable determiner 18 specifies, for the selected explanatory variable, a variable having a relation (a part-of relation, a reference relation, or the like) defined in the structure data (step S8). The variable determiner 18 determines the selected explanatory variable and the specified variable as drawing variables.

The variable structure generator 19 draws a graph representing a relation between the drawing variables (step S9). The display 20 displays the graph drawn by the variable determiner 18 (step S9).

As explained above, according to this embodiment, a regularization term reflecting structure of variables are automatically generated. An explanatory variable used in a model is selected by optimizing an objective function including the generated regularization term. Consequently, the user can specify an explanatory variable to be a candidate of a factor even if the user himself or herself does not design the regularization term. The specified explanatory variable and a variable structurally having a relation with the explanatory variable are specified as drawing variables. A structural relation between the drawing variables is displayed by a graph. Consequently, a variable selection result with high interpretability can be obtained.

Varieties of abnormalities, failures, and performance deterioration sometimes occur. The information processing apparatus is also capable of generating models (select explanatory variables) for the respective types of the abnormalities, the failures, and the performance deterioration. Models may be stored for a respective plurality of types of abnormalities, failures, and performance deterioration. The user is also capable of specifying the types having similar factors by comparing drawings based on the models in a graph.

Modification 1

In FIG. 4, the example of the structure data defined when the apparatus is the conveyance apparatus is shown. However, the structure data can be defined in the same manner when the apparatus is an apparatus other than the conveyance apparatus.

Figure 17:
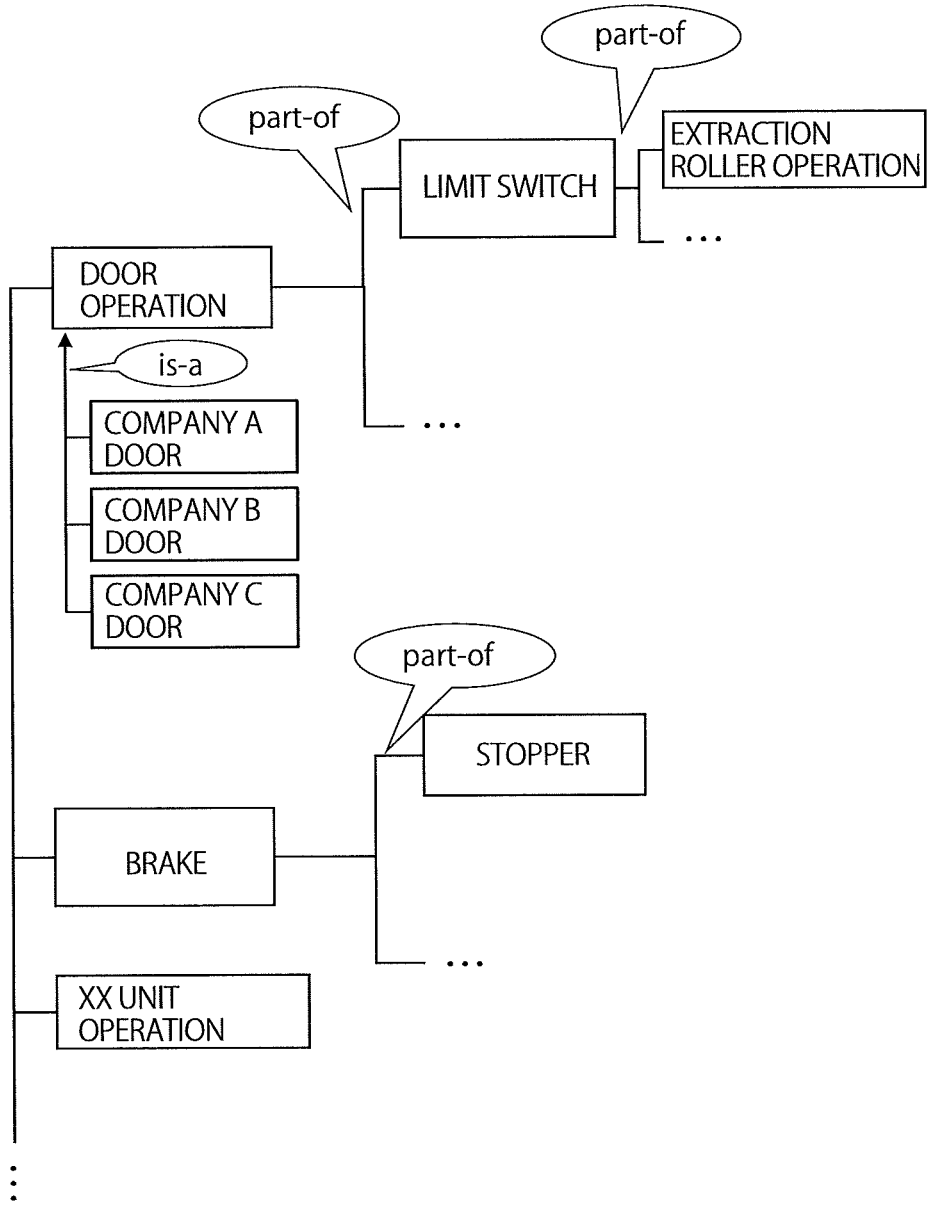
FIG. 17 is a diagram showing an example of structure data defined when an apparatus is an elevator.

FIG. 17 shows an example of structure data defined when the apparatus is an elevator.

Figure 18:
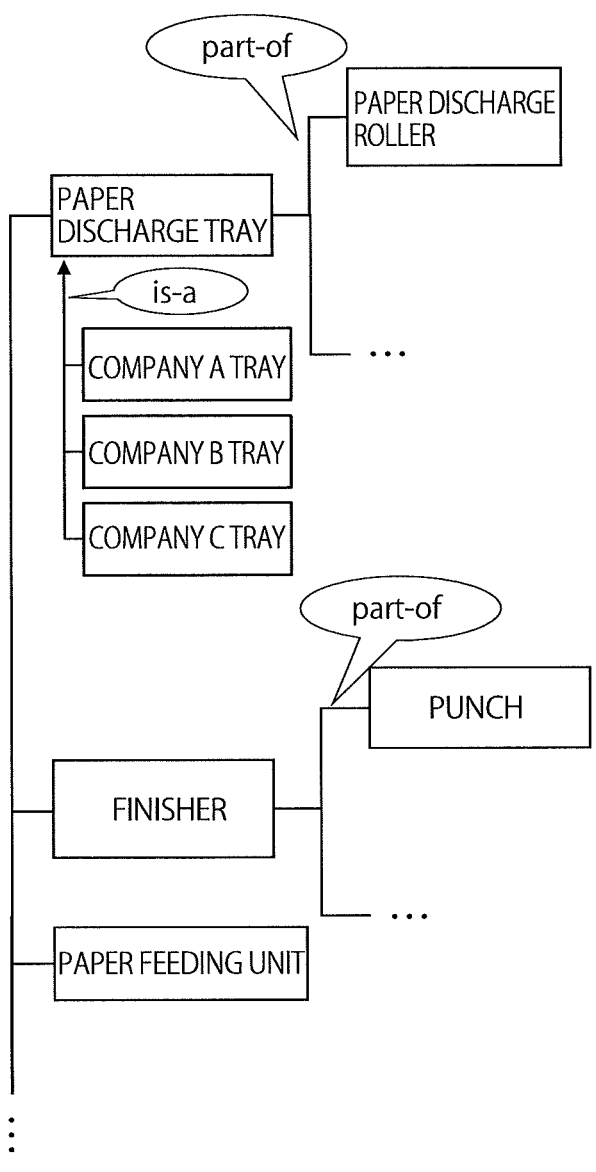
FIG. 18 is a diagram showing an example of structure data defined when an apparatus is an MFP (Multi-Function Peripheral)

FIG. 18 shows an example of structure data defined when the apparatus is an MFP (Multi-Function Peripheral).

In both of FIGS. 17 and 18, the structure data can be defined in the same tree structure-based format except that only names of nodes (variables) are different from those shown in FIG. 4. When the structure data is represented in the table format, the structure data can be represented in the same manner as shown in FIG. 3.

Modification 2

The regularization-rule input device 15 may repeatedly receive a re-input of regularization rule data in which a value of a regularization parameter (a hyper parameter) is adjusted and perform the processing in this embodiment based on the re-input regularization rule data. In every repetition, a set of the regularization parameter and a drawing result may be saved in the storage device in association with each other. The user may be enabled to display data of sets on the display 20 while switching the data and compare the sets.

The user may be enabled to compare the sets and select a most effective regularization parameter out of regularization parameters used in the sets. The selected regularization parameter may be adjusted in the next and subsequent processing (for example, when the processing in this embodiment is performed on operation data acquired within a future period).

Second Embodiment

In a second embodiment, for example, detection of occurrence of a predetermined event such as a failure, an abnormality, or performance deterioration is determined using the model generated in the first embodiment. This embodiment is explained below.

Figure 19:
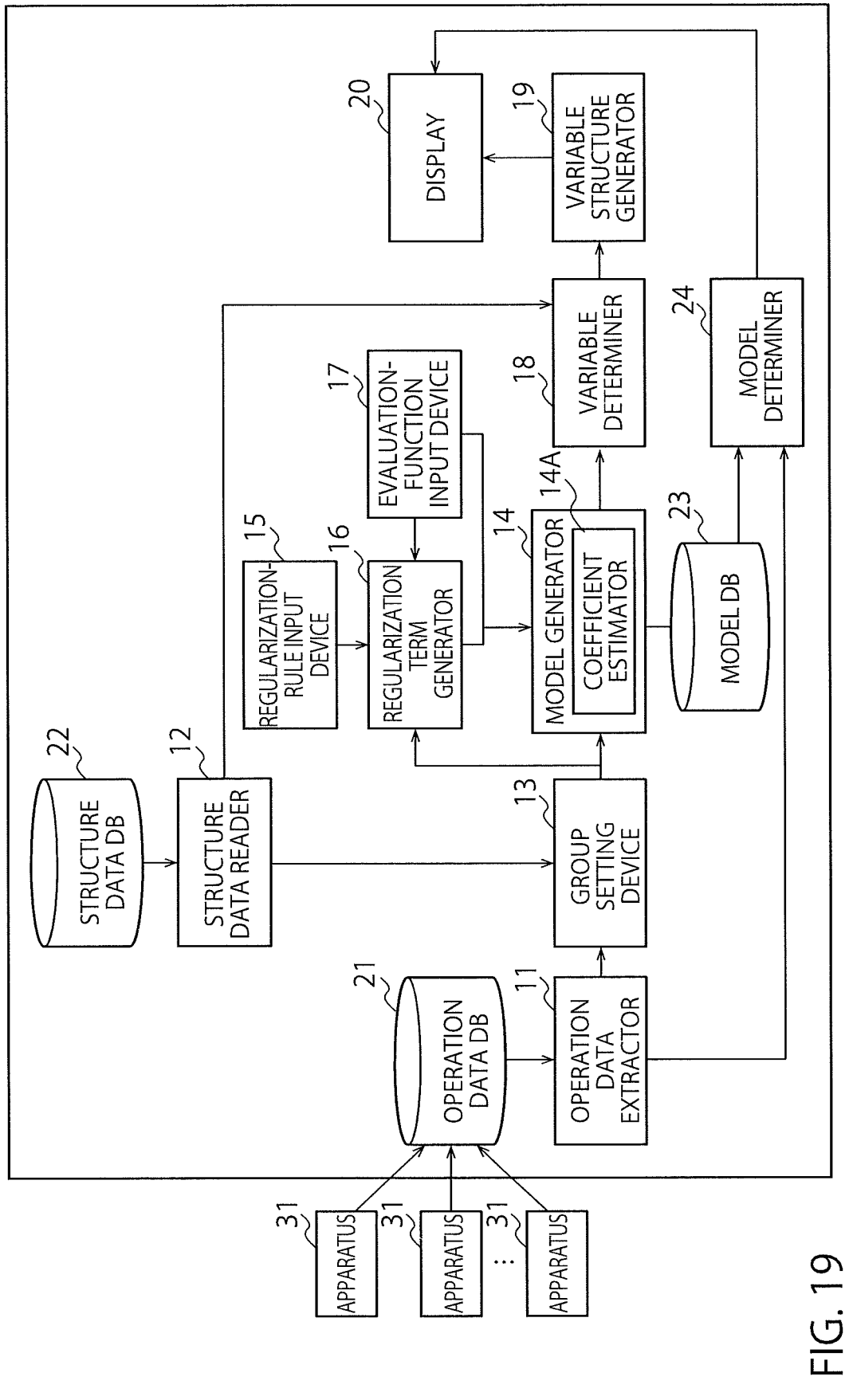
FIG. 19 is a block diagram of an information processing apparatus according to a second embodiment.

FIG. 19 is a block diagram of an information processing apparatus according to this embodiment. A model determiner 24 and a model DB 23 are added to the block diagram of FIG. 1.

The model DB 23 stores a model generated by the model generator 14. As an example, a form of a function of the model and a coefficient of a selected explanatory variable are stored in the model DB 23.

Operation data sequentially collected from an apparatus 31 connected via a network is stored in the operation data DB 21. As an example, operation data is stored in the operation data DB 21 for apparatuses at every fixed time. The operation data extractor 11 reads out operation data (for example, operation data collected after generation of a model) from the operation data DB 21 one by one as a sample and supplies the operation data to the model determiner 24.

The model determiner 24 determines, based on the model (a regression model) stored in the model DB 23 and the provided sample, whether a predetermined event (failure, abnormality, performance deterioration, or the like) has occurred. The model determiner 24 specifies, in the sample, an explanatory variable included in the model, calculates a model using the specified explanatory variable, and compares an output value of the model with a determination threshold. In this way, the model determiner 24 determines whether the event has occurred. As an example, if the output value is larger than the determination threshold, the model determiner 24 determines that the event has occurred. If the output value is equal to or smaller than the determination threshold, the model determiner 24 determines that the event has not occurred. A plurality of the determination thresholds may be present. Results of the determination may be classified into three or more.

When a result of the determination indicates that the predetermined event has occurred, the model determiner 24 displays, on the display 20, the result of the determination (for example, a result label indicating that an abnormality has occurred) and the sample used for the determination. The model determiner 24 may display an alert on the display 20. In this case, the model determiner 24 may display a drawing graph of a variable structure for the model (the graph generated in the first embodiment) on the display 20. The alert may be performed not only by display of a screen but also by sound, vibration, or the like.

Among a plurality of variables (explanatory variables) included the regression model, a variable contributing to abnormality detection or the like most may be output with ranking.

Varieties of abnormalities, failures, and performance deterioration sometimes occur. The information processing apparatus is also capable of generating models for the respective types of the abnormalities, the failures, and the performance deterioration. In this case, models may be stored for a respective plurality of types of abnormalities, failures, and performance deterioration. It is also possible to discriminate, by classifying the same samples in a plurality of models, whether each of an abnormality, a failure, and performance deterioration has occurred.

Third Embodiment

In a third embodiment, every time operation data is accumulated in the operation data DB 21 by a fixed amount or for a fixed period, generation of a model, determination of a drawing variable, and drawing of variable structure data are performed and results of the generation of a model, the determination of a drawing variable, and the drawing of variable structure data are saved. When the drawing variable is compared with a drawing variable generated in the previous time and a change occurs, an alert is output to the display 20 assuming that a mechanism or a cause of occurrence of an event (for example, occurrence of an abnormality) has changed.

In general, in a situation in which presence or absence of occurrence of an event is detected and monitored during operation, when an event in an allowable range occurs (for example, even if an output value of a model with a low frequency is equal to or larger than a determination threshold, the output value is smaller than an allowable limit value), the operation of an apparatus is sometimes continued. This is a strategy adopted in monitoring of a large infrastructure when a state of an apparatus in operation is periodically or non-periodically preserved by maintenance. In this embodiment, this strategy is adopted when the variable structure data does not change and, at the same time, when the variable structure data changes, an alert is output assuming that an event has occurred due to a cause different from normal operation.

Figure 20:
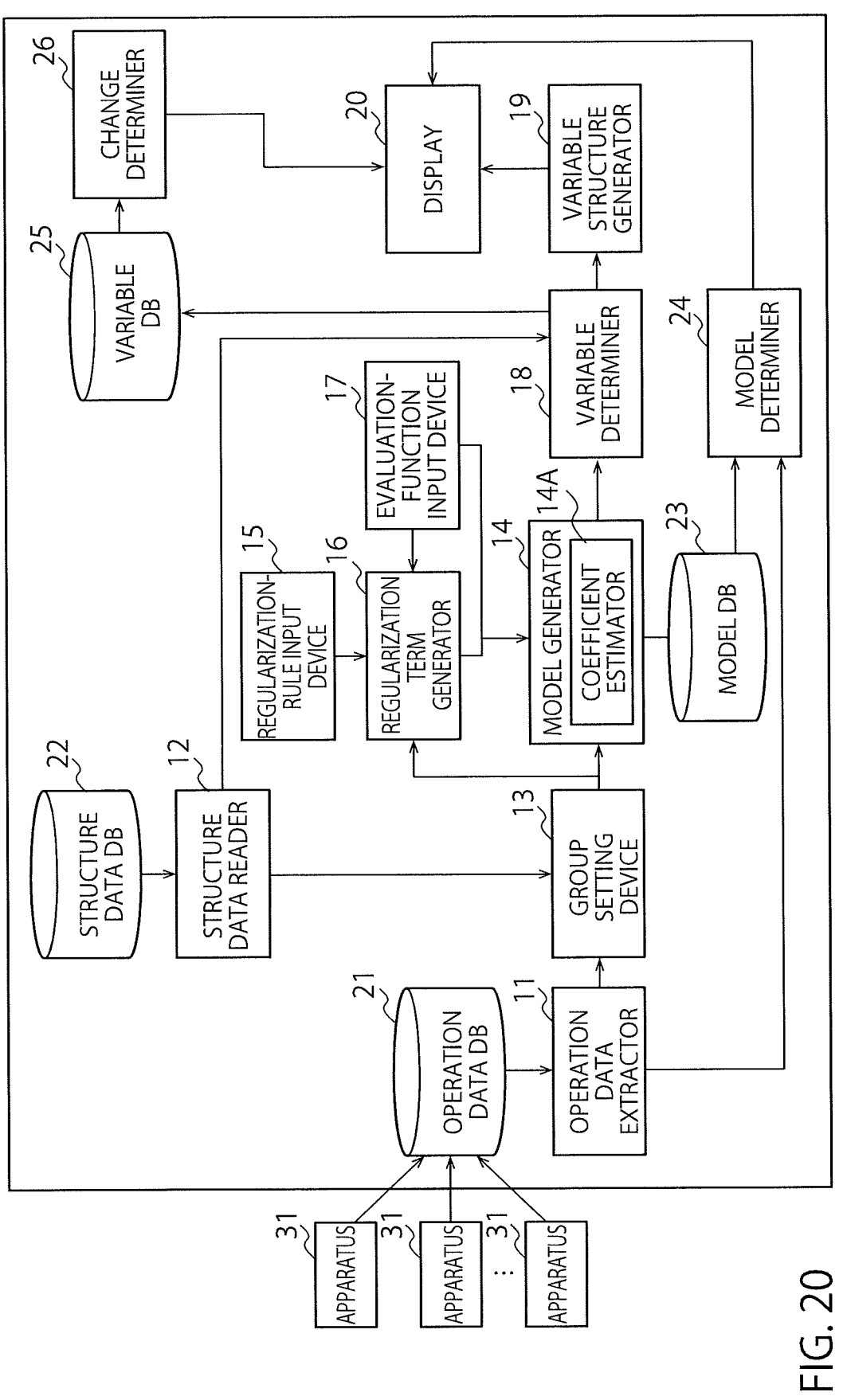
FIG. 20 is a block diagram of an information processing apparatus according to a third embodiment.

FIG. 20 is a block diagram of an information processing apparatus according to this embodiment. A variable DB 25 and a change determiner 26 are added to the block diagram of FIG. 19.

The information processing apparatus performs generation of a model, determination of a drawing variable, and drawing of variable structure data every time operation data is accumulated in the operation data DB 21 by a fixed amount or for a fixed period and saves results of the generation of a model, the determination of a drawing variable, and the drawing of variable structure data. For example, the information processing apparatus performs generation of a model, determination of a drawing variable, and drawing of variable structure data for each of first operation data acquired in a first period and second operation data acquired in a second period later than the first period and saves results of the generation of a model, the determination of a drawing variable, and the drawing of variable structure data.

The variable DB 25 stores an identifier of a drawing variable determined by the variable determiner 18. As an example, the variable DB 25 stores an identifier of a drawing variable every time model generation is performed by the model generator 14. The variable DB 25 may store, as the variable structure data, drawing data drawn by the variable structure generator 19.

The change determiner 26 determines whether a drawing variable generated this time (for example, a drawing variable obtained for the second operation data) and a drawing variable generated last time (for example, a drawing variable obtained for the first operation data) are the same. When the drawing variables are the same, the change determiner 26 determines that there is no problem. When the drawing variables are different, the change determiner 26 determines that a mechanism, a cause, or the like of occurrence of an event has changed and outputs an alert to the display 20. The display 20 displays the alert. As another method, the change determiner 26 may determine whether variable structure data drawn this time is the same as variable structure data drawn last time. When the variable structure data are the same, the change determiner 26 determines that there is no problem. When the variable structure data are different, the change determiner 26 determines that a mechanism, a cause, or the like of occurrence of an event has changed and outputs an alert to the display 20.

The model determiner 24 basically operates in the same manner as in the second embodiment. However, when an event in an allowable range occurs (for example, even if an output value of a model with a low frequency is equal to or larger than a determination threshold, the output value is smaller than an allowable limit value), the model determiner 24 allows operation without outputting an alert. When the output value exceeds the allowable range, the model determiner 24 outputs an alert in the same manner as in the second embodiment.

Fourth Embodiment

Figure 21:
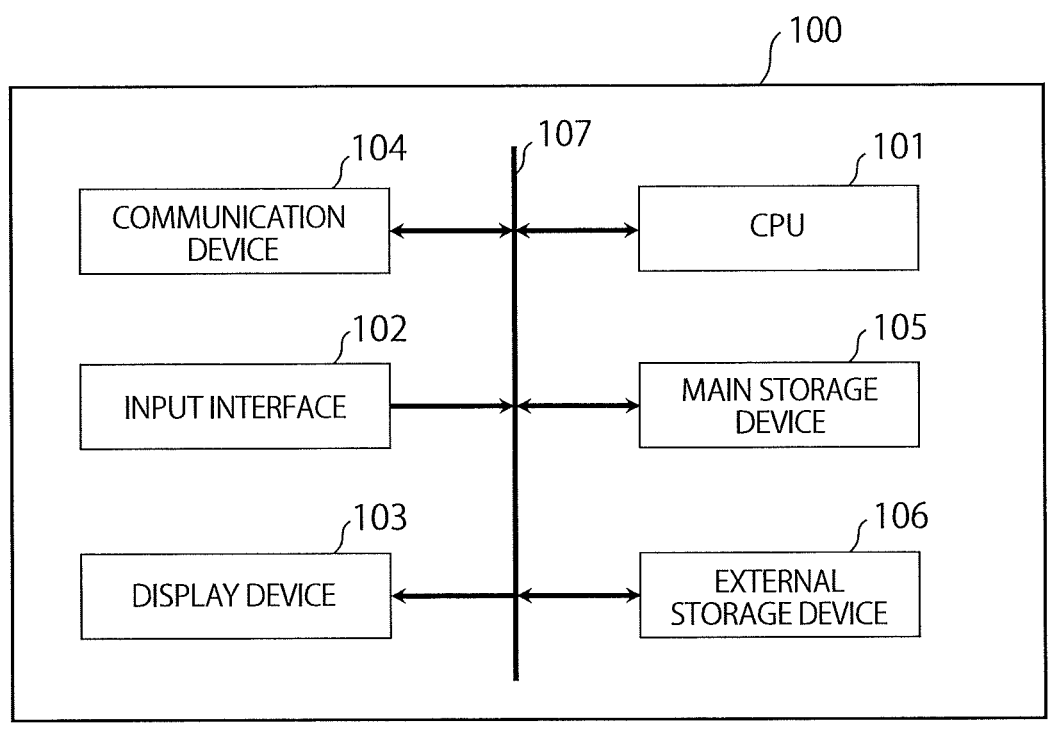
FIG. 21 is a diagram showing a hardware configuration of an information processing apparatus according to a fourth embodiment.

FIG. 21 illustrates a hardware configuration of the information processing apparatus according to the present embodiment. As the information processing apparatus of the present embodiment, the information processing apparatus of one of the first to the third embodiments can be applied. The information processing apparatus according to the present embodiment is achieved by a computer device 100. The computer device 100 includes a CPU 101, an input interface 102, a display device 103, a communication device 104, a main storage device 105, and an external storage device 106. These components are connected with each other through a bus 107.

The CPU (central processing unit) 101 executes an information processing program as a computer program on the main storage device 105. The information processing program achieves each above-described functional configuration of the information processing apparatus. The functional configuration is achieved by the CPU 101 executing the information processing program.

The input interface 102 is a circuit for inputting an operation signal from an input device such as a keyboard, a mouse, or a touch panel to the information processing apparatus.

The display device 103 displays data or information output from the information processing apparatus. The display device 103 is, for example, a liquid crystal display (LCD), a cathode-ray tube (CRT), or a plasma display (PDP), but not limited thereto. Data or information output from the diagnosis result generator 130 or the graph creator 140 can be displayed on the display device 103.

The communication device 104 is a circuit configured to allow the information processing apparatus to communicate with an external device in a wireless or wired manner. Data input from an external device through the communication device 104 can be stored in each DB in FIG. 1. As an example, the communication device 104 may communicate with a communication device mounted in an apparatus to acquire operation data, and store the operation data in the operation data DB 21.

The main storage device 105 stores, for example, the information processing program, data necessary for executing the information processing program, and data generated through execution of the information processing program. The information processing program is loaded onto the main storage device 105 and executed. The main storage device 105 is, for example, a RAM, a DRAM, or an SRAM, but not limited thereto. Each DB in FIG. 1 may be established on the main storage device 105.

The external storage device 106 stores, for example, the information processing program, data necessary for executing the information processing program, and data generated through execution of the information processing program. The program and data are read by the main storage device 105 at execution of the information processing program. The external storage device 106 is, for example, a hard disk, an optical disk, a flash memory, or a magnetic tape, but not limited thereto. Each DB in FIG. 1 may be established on the external storage device 106.

The information processing program may be installed on the computer device 100 in advance or stored in a storage medium such as a CD-ROM. The information processing program may be uploaded on the Internet.

The information processing apparatus may be achieved by the single computer device 100 or achieved as a system of a plurality of computer devices 100 connected with each other. The information processing apparatus can be arranged in a cloud network and receive operation input via the Internet from a user.

While certain approaches have been described, these approaches have been presented by way of example only, and are not intended to limit the scope of the inventions. Indeed, the apparatuses described herein may be embodied in a variety of other forms; furthermore various omissions, substitutions and changes in the form of the apparatuses described herein may be made. The accompanying claims and their equivalents are intended to cover such forms or modifications as would fall within the scope of the inventions.

The invention claimed is:

1. An information processing apparatus comprising:
    processing circuitry configured to:
    read operation data of a target apparatus including a plurality of variables obtained by sensing a plurality of components in the target apparatus with a plurality of sensors monitoring the plurality of components and structure data representing structural relation among the plurality of variables from at least one memory, the operation data including whether or not a predetermined event has occurred,
    group variables having a same type of structural relation among the plurality of variables in the operating data into a same group based on the structure data to generate a plurality of groups of at least one group type corresponding to a type of structural relation of variables in the groups, each of the plurality of variables being included in one of the plurality of groups,
    determine at least one regularization type corresponding to the plurality of groups based on mapping data mapping a plurality of group types to a plurality of regularization types and based on group types of the plurality of groups, and generate at least one regularization term including a coefficient for the variables included in the groups for the at least one regularization type, select an evaluation function to be used among a plurality of evaluation functions, depending on whether or not there is an overlap of variables among the plurality of groups, each evaluation function including the coefficients for the plurality of variables and the plurality of variables,
    generate an objective function including the least one regularization term generated for the at least one regularization type and including the selected evaluation function,
    estimate, based on the operation data and the objective function, values of a plurality of coefficients for the plurality of variables,
    select only variables with an absolute value greater than zero from the plurality of variables based on the values of the estimated coefficients, and
    identify, as drawing variables, the selected variables and their structurally adjacent variables determined based on the structure data,
    generate, in a form of a table or graph, variable structure data that visually represents the drawing variables and structural relationships among the drawing variables, wherein the selected variables correspond to components having more influence on occurrence of the predetermined event among the plurality of components in the target apparatus and the non-selected variables correspond to components less influence on occurrence of the predetermined event among the plurality of components; and a display circuit configured to display the variable structure data visibly to a user, wherein the processing circuitry constructs, based on a value of the coefficient estimated for the selected variable and the selected variable, a model of detecting occurrence of the predetermined event in the target apparatus, and the apparatus comprises receiving circuitry configured to receive an operation data acquired by the plurality of sensors via a network, and the processing circuitry calculates an output value of the model based on the operation data received in the receiving circuitry, and detects the occurrence of the predetermined event in the target apparatus based on the output value, wherein the display displays the variable structure data when the processing circuitry detects the occurrence of the predetermined event in the target apparatus so that the user is able to specify a component that caused the occurrence of the predetermined event among the plurality of components in the target apparatus to one of the components corresponding to the selected variables, the operation data includes first operation data acquired in a first period and second operation data acquired in a second period later than the first period, the processing circuitry is configured to perform processing on the first operation data to select first variables being the variables with the absolute value greater than zero from the plurality of variables, and perform processing on the second operation data to select second variables being the variables with the absolute value greater than zero from the plurality of variables, the processing circuitry is configured to determine whether a first set of drawing corresponding to the first operation data structurally differs a second set of drawing variables corresponding to the second operation data and, when a structural difference is detected between the first and second sets of drawing variables, output an alert indicating that mechanism of occurrence of the predetermined event in the target apparatus has changed.

2. The apparatus according to claim 1, wherein the at least one group type indicates a group of a class relation integrating variables corresponding to instances of a class, there are two or more groups each having the class relationship, there is no overlap of variables among the groups, the processing circuitry is configured to generate a regularization term of Group Lasso for the groups of the class relation, and the drawing variables include both selected variables and adjacent variables, each corresponding to an instance of the class associated with its group.

3. The apparatus according to claim 1, wherein the at least one group type indicates a group of a hierarchical relation integrating variables corresponding to low-order nodes having a common high-order node in a tree structure, there are two or more groups each having the hierarchical relation, there is no overlap of variables among the groups, the processing circuitry is configured to generate a regularization term of Overlapping Group Lasso for the groups of the hierarchical relation, and the drawing variables include both selected variables corresponding to the low-order nodes and structurally adjacent variables including the high-order node associated with the hierarchical relation.

4. The apparatus according to claim 3, wherein the high-order node is a parent node of the plurality of low-order nodes and the drawing variables include at least one of the selected variables corresponding to the low-order nodes and the parent node as a structurally adjacent variable.

5. The apparatus according to claim 1, wherein the at least one group type indicates a group of a reference relation integrating variables having a reference relation, the processing circuitry is configured to generate a regularization term of Clustered Lasso for the group of the reference relation, and the drawing variables include selected variables belonging to the group of the reference relation and adjacent variables connected via the reference relation.

6. The apparatus according to claim 1, further comprising:
a regularization-rule input circuitry to receive a value of a regularization parameter included in the regularization term, wherein
the processing circuitry is configured to generate the regularization term using the input value of the regularization parameter to generate variable structure data including drawing variables based on the generated regularization term.

7. The apparatus according to claim 1, comprising:
a display to display the variable structure data, wherein
a regularization-rule input circuitry receives a plurality of values of the regularization term,
the processing circuitry is configured to generate the variable structure data for each of the plurality of values of the regularization parameter,
the display comparably displays a plurality of sets of the plurality of values and a plurality of the variable structure data corresponding to the plurality of values, and
each of the variable structure data includes drawing variables representing selected variables and adjacent variables based on a structure relation.

8. The apparatus according to claim 1, wherein the processing circuitry sums the at least one regularization term generated for the at least one regularization type and the selected evaluation function to generate the objective function, or subtracts the at least one regularization term generated for the at least one regularization type from the selected evaluation function to generate the objective function, and the objective function is used to identify selected variables and generate drawing variables including their adjacent variables.

9. The apparatus according to claim 8, wherein the processing circuitry minimizes or maximizes the objective function to obtain the values of a plurality of coefficients for the plurality of variables and generates variable structure data including drawing variables based on the result of the optimization.

10. The apparatus according to claim 1, wherein
the processing circuitry optimizes the objective function based on, the operation data to estimate the values of the plurality of coefficients for the plurality of variables and extracts a function part of the optimized objective function, which includes the selected variables and the coefficients of the selected variables, and which does not include non-selected variables and the coefficients of the non-selected variables, wherein the extracted function part corresponds to the model of detecting occurrence of the predetermined event in the target apparatus, and the drawing variables are based on the selected variables used in the model and their structurally adjacent variables.

11. The apparatus according to claim 1, wherein the predetermined event is abnormality, and the drawing variables represent components related to occurrence of the abnormality, including both selected variables and structurally adjacent variables.

12. The apparatus according to claim 1, wherein the at least one group type indicates a plurality of group types, the plurality of group types indicates a group of a class relation integrating variables corresponding to instances of a class, and a group of a hierarchical relation integrating variables corresponding to low-order nodes having a common high-order node in a tree structure, there are two or more groups each having the class relationship, there is no overlap of variables among the groups, and the processing circuitry is configured to generate a regularization term of Group Lasso for the groups of the class relation, there are two or more groups each having the hierarchical relation, there is no overlap of variables among the groups, and the processing circuitry is configured to generate a regularization term of Overlapping Group Lasso for the groups of the hierarchical relation, and the drawing variables include selected variables and adjacent variables derived from each of the class relation and the hierarchical relation.

13. An information processing method performed by a computer including a processor and a memory comprising:

reading operation data of a target apparatus including a plurality of variables obtained by sensing a plurality of components in the target apparatus with a plurality of sensors monitoring the plurality of components in the target apparatus and structure data representing structural relation among the plurality of variables from at least one memory, the operation data including whether or not a predetermined event has occurred;

grouping variables having a same type of structural relation among the plurality of variables in the operating data into a same group based on the structure data to generate a plurality of groups of at least one group type corresponding to a type of structural relation of variables in the groups, each of the plurality of variables being included in one of the plurality of groups;

determining at least one regularization type corresponding to the plurality of groups based on mapping data mapping a plurality of group types to a plurality of regularization types and based on group types of the plurality of groups, and generate at least one regularization term including a coefficient for the variables included in the groups for the at least one regularization type;

selecting an evaluation function to be used among a plurality of evaluation functions, depending on whether or not there is an overlap of variables among the plurality of groups, each evaluation function including the coefficients for the plurality of variables and the plurality of variables, generating an objective function including the at least one regularization term generated for the at least one regularization type and including the selected evaluation function, and optimizing the objective function based on the operation data to estimate values of a plurality of coefficients for the plurality of variables;

selecting only variables with an absolute value greater than zero from the plurality of variables based on the values of the estimated coefficients;

identify, as drawing variables, the selected variables and their structurally adjacent variables determined based on the structure data;

generating, in a form of a table or graph, variable structure data that visually represents the drawing variables and structural relationships among the drawing variables, wherein the selected variables correspond to components having more influence on occurrence of the predetermined event among the plurality of components in the target apparatus and the non-selected variables correspond to components less influence on occurrence of the predetermined event among the plurality of components;

displaying the variable structure data visibly to a user;

constructing, based on a value of the coefficient estimated for the selected variable and the selected variable, a model of detecting occurrence of the predetermined event in the target apparatus;

receiving an operation data acquired by the plurality of sensors via a network;

calculating an output value of the model based on the operation data received, and detecting the occurrence of the predetermined event in the target apparatus based on the output value; and displaying the variable structure data so that the user is able to specify a component that caused the occurrence of the predetermined event among the plurality of components in the target apparatus to one of the components corresponding to the selected variables, wherein the operation data includes first operation data acquired in a first period and second operation data acquired in a second period later than the first period, the processes comprises performing processing on the first operation data to select first variables being the variables with the absolute value greater than zero from the plurality of variables, and performing processing on the second operation data to select second variables being the variables with the absolute value greater than zero from the plurality of variables, determining whether a first set of drawing corresponding to the first operation data structurally differs a second set of drawing variables corresponding to the second operation data and, when a structural difference is detected between the first and second sets of drawing variables, outputting an alert indicating that a structural mechanism of occurrence of the predetermined event in the target apparatus has changed.

14. A non-transitory computer readable medium having a computer program stored therein which causes a computer to perform processes comprising:

reading operation data of a target apparatus including a plurality of variables obtained by sensing a plurality of components in the target apparatus with a plurality of sensors monitoring the plurality of components in the target apparatus and structure data representing structural relation among the plurality of variables from at least one memory, the operation data including whether or not a predetermined event has occurred;

grouping variables having a same type of structural relation among the plurality of variables in the operating data into a same group based on the structure data to generate a plurality of groups of at least one group type corresponding to a type of structural relation of variables in the groups, each of the plurality of variables being included in one of the plurality of groups;

determining at least one regularization type corresponding to the plurality of groups based on mapping data mapping a plurality of group types to a plurality of regularization types and based on group types of the plurality of groups, and generate at least one regularization term including a coefficient for the variables included in the groups for the at least one regularization type;

selecting an evaluation function to be used among a plurality of evaluation functions, depending on whether or not there is an overlap of variables among the plurality of groups, each evaluation function including the coefficients for the plurality of variables and the plurality of variables, generating an objective function including the at least one regularization term generated for the at least one regularization type and including the selected evaluation function, and optimizing the objective function based on the operation data to estimate values of a plurality of coefficients for the plurality of variables;

selecting only variables with an absolute value greater than zero from the plurality of variables based on the values of the estimated coefficients;

identify, as drawing variables, the selected variables and their structurally adjacent variables determined based on the structure data;

generating, in a form of a table or graph, variable structure data that visually represents the drawing variables and structural relationships among the drawing variables components in the target apparatus, wherein the selected variables correspond to components having more influence on occurrence of the predetermined event among the plurality of components in the target apparatus and the non-selected variables correspond to components less influence on occurrence of the predetermined event among the plurality of components;

displaying the variable structure data visibly to a user;

constructing, based on a value of the coefficient estimated for the selected variable and the selected variable, a model of detecting occurrence of the predetermined event in the target apparatus;

receiving an operation data acquired by the plurality of sensors via a network;

calculating an output value of the model based on the operation data received, and detecting the occurrence of the predetermined event in the target apparatus based on the output value; and displaying the variable structure data so that the user is able to specify a component that caused the occurrence of the predetermined event among the plurality of components in the target apparatus to one of the components corresponding to the selected variables, wherein the operation data includes first operation data acquired in a first period and second operation data acquired in a second period later than the first period, the processes comprises performing processing on the first operation data to select first variables being the variables with the absolute value greater than zero from the plurality of variables, and performing processing on the second operation data to select second variables being the variables with the absolute value greater than zero from the plurality of variables, determining whether a first set of drawing corresponding to the first operation data structurally differs a second set of drawing variables corresponding to the second operation data and, when a structural difference is detected between the first and second sets of drawing variables outputting an alert indicating that a structural mechanism of occurrence of the predetermined event in the target apparatus has changed.

*    *    *    *    *